US011405703B2

(12) United States Patent
Xiang et al.

(10) Patent No.: US 11,405,703 B2
(45) Date of Patent: Aug. 2, 2022

(54) METHOD AND APPARATUS FOR TRANSMISSION USING INTERFACE, AND DEVICE

(71) Applicant: HUAWEI TECHNOLOGIES CO., LTD., Shenzhen (CN)

(72) Inventors: Junling Xiang, Shenzhen (CN); Chiwu Ding, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 68 days.

(21) Appl. No.: 16/886,857

(22) Filed: May 29, 2020

(65) Prior Publication Data
US 2020/0296486 A1   Sep. 17, 2020

Related U.S. Application Data

(63) Continuation of application No. PCT/CN2018/091753, filed on Jun. 19, 2018.

(30) Foreign Application Priority Data

Nov. 30, 2017 (CN) .......................... 201711234585.3

(51) Int. Cl.
*H04J 14/08* (2006.01)
*H04Q 11/00* (2006.01)
*H04B 10/27* (2013.01)

(52) U.S. Cl.
CPC ......... *H04Q 11/0062* (2013.01); *H04B 10/27* (2013.01); *H04J 14/086* (2013.01); *H04Q 2011/0086* (2013.01)

(58) Field of Classification Search
CPC ........ H04Q 11/0062; H04Q 2011/0086; H04B 10/27; H04B 10/40; H04B 10/43;
(Continued)

(56) References Cited

U.S. PATENT DOCUMENTS 7,433,941 B1 * 10/2008 Lavian ............... H04L 41/0213
709/224
10,680,733 B2 * 6/2020 Su ....................... H04L 12/4633
(Continued)

FOREIGN PATENT DOCUMENTS

CN   101155016 A   4/2008
CN   104737501 A   6/2015
(Continued)

OTHER PUBLICATIONS

Rapporteurs Q11/15,"Draft Recommendation ITU-T G.FlexO (proposed 6.709.1)", International Telecommunication Union, Study Group 15, TD 450 Rev.I (WP 3/15), Geneva, Feb. 15-26, 2016, total 23 pages. XP044166048.

(Continued)

*Primary Examiner* — Hibret A Woldekidan
(74) *Attorney, Agent, or Firm* — Maier & Maier, PLLC

(57) ABSTRACT

A method and an apparatus for transmission using an interface, and a device. The method includes: obtaining a byte block stream, where byte blocks in the byte block stream are of a predetermined byte length; mapping the byte block stream to corresponding timeslots, where each timeslot corresponds to one byte block; distributing the byte block stream mapped to the timeslots; processing the distributed byte block stream based on an interface type configured for a physical interface; and sending the processed byte block stream. In the embodiments, data is transmitted based on a byte block distribution mechanism, to support different interface types, and a coupling relationship between service adaptation and a physical layer is decoupled, so that evolution and extension of transmission interface types do not affect a service adaptation procedure, thereby simplifying a transmission system.

20 Claims, 17 Drawing Sheets

(58) Field of Classification Search
CPC .......... H04J 14/086; H04J 3/16; H04J 3/1652; H04J 14/08; H04J 2203/0091; H04J 3/1676; H04J 3/1658; H04J 3/1664; H04J 3/167; H04J 3/1694; H04J 3/0685; H04L 12/4633; H04L 41/044; H04L 41/0803
USPC ............ 398/57, 58, 135, 66, 98–100, 69, 52
See application file for complete search history.

(56) References Cited

U.S. PATENT DOCUMENTS

| | | | |
|---|---|---|---|
| 2007/0083628 A1* | 4/2007 | Sandstrom | ............ H04L 41/044 709/223 |
| 2010/0221005 A1 | 9/2010 | Zhao | |
| 2012/0071141 A1 | 3/2012 | Nicoara et al. | |
| 2016/0127072 A1* | 5/2016 | Chen | ...................... H04B 10/27 398/58 |
| 2017/0031689 A1 | 2/2017 | Wokhlu et al. | |
| 2017/0093757 A1 | 3/2017 | Gareau et al. | |
| 2017/0244648 A1* | 8/2017 | Tse | ..................... H04N 21/2365 |
| 2020/0374023 A1* | 11/2020 | Su | ............................. H04J 3/16 |

FOREIGN PATENT DOCUMENTS

| | | |
|---|---|---|
| CN | 106330417 A | 1/2017 |
| CN | 106411454 A | 2/2017 |
| EP | 2 120 380 A1 | 11/2009 |

OTHER PUBLICATIONS

ITU-T, Telecommunication Standardization Sector of ITU, "Recommendation ITU-T 6.872, Architecture of optical transport networks", Rec. ITU-T 6.872 (Jan. 2017), total 68 pages. XP044190105.

* cited by examiner

|   | 1 | 7 8 | 14 | 15 | 16 17 | 3824 | 3825 | 4080 |
|---|---|---|---|---|---|---|---|---|
| 1 | FAS | OTUk OH | | | | | | |
| 2 | | | | OPUk OH | Payload | | OTUk FEC | |
| 3 | ODUk OH | | | | | | | |
| 4 | | | | | | | | |

FIG. 4

ования No. PCT/CN2018/091753, filed on Jun. 19, 2018, which claims priority to Chinese Patent Application No. 201711234585.3, filed on Nov. 30, 2017. The disclosures of the aforementioned applications are hereby incorporated by reference in their entireties.

METHOD AND APPARATUS FOR TRANSMISSION USING INTERFACE, AND DEVICE

CROSS-REFERENCE TO RELATED APPLICATIONS

This application is a continuation of International Patent Application No. PCT/CN2018/091753, filed on Jun. 19, 2018, which claims priority to Chinese Patent Application No. 201711234585.3, filed on Nov. 30, 2017. The disclosures of the aforementioned applications are hereby incorporated by reference in their entireties.

TECHNICAL FIELD

The embodiments relate to the field of data transmission, and in particular, to a method and an apparatus for transmission using an interface, and a device.

BACKGROUND

With continuous increase of service traffic and continuous enrichment of service types, transmission technologies of a transport network evolve and develop.

As a core technology of the transport network, an optical transport network (OTN) has evolved from a conventional OTN to a multi-service optical transport network (MS-OTN), and further evolves toward a flexible optical transport network (Flex-OTN) in a beyond-100 G era. A flexible and efficient end-to-end bearer solution is provided owing to flexible service bearing and a flexible line port rate, thereby meeting an operation requirement of an operator for a refined bandwidth resource.

To support different service rates, transmission interface types of the OTN are continuously enriched during continuous evolution and development. For example, in the related art, the transmission interface types of the OTN include an optical transport unit-k (OTUk) interface, an optical transport unit-Cn (OTUCn) interface, a flexible optical transport network (FlexO) interface, and the like, and more types of transmission interfaces will appear in the future. However, continuous increase of the transmission interface types leads to more mapping paths, causing an increasingly complex OTN transmission system.

SUMMARY

Embodiments provide a method and an apparatus for transmission using an interface, and a device, to provide a programmable interface, and to resolve a problem that a transmission system becomes more complex during continuous evolution of an OTN.

According to a first aspect, a method for transmission using an interface is provided. The method for transmission using an interface is applied to an interface variable device, and includes:

obtaining, by the interface variable device, a byte block stream, where byte blocks in the byte block stream are of a predetermined byte length;

mapping, by the interface variable device, the byte block stream to corresponding timeslots, where each timeslot corresponds to one byte block;

distributing, by the interface variable device, the byte block stream mapped to the timeslots;

processing, by the interface variable device, the distributed byte block stream based on an interface type configured for a physical interface; and sending, by the interface variable device, the processed byte block stream.

In this embodiment, the interface variable device maps the byte block stream in a form of byte blocks to the timeslots, distributes the byte block stream mapped to the timeslots, and before the byte block stream is transmitted by using the physical interface, processes the distributed byte block stream based on the interface type that the physical interface is to be presented as. Then the processed byte block stream is transmitted by using the physical interface. The interface variable device transmits data by using the foregoing byte block-based distribution mechanism, to support different interface types, and decouple a coupling relationship between service adaptation and a physical (PHY) layer, so that evolution and extension of transmission interface types do not affect a service adaptation procedure during continuous evolution of an OTN, thereby simplifying a transmission system of the OTN.

In a possible implementation, before the mapping, by the interface variable device, the byte block stream to corresponding timeslots, the method further includes:

determining, by the interface variable device, a timeslot size of the timeslots and a quantity of timeslots based on the interface type.

The interface variable device determines, based on the interface type that the physical interface is presented as, the size of the timeslots to which the byte block stream is mapped and a quantity of timeslots in one timeslot period, and completes timeslot mapping based on the determined timeslot size and quantity of timeslots, to ensure that the byte block stream output by the physical interface meets a transmission rate requirement of the presented interface type.

In a possible implementation, the processing the distributed byte block stream based on an interface type configured for a physical interface includes:

determining, by the interface variable device, overhead information and an overhead block format based on the interface type, where the overhead information is used to indicate an insertion interval of an overhead block and a quantity of overhead blocks to be inserted each time; and performing, by the interface variable device, overhead processing on the distributed byte block stream based on the overhead information and the overhead block format.

In this embodiment, the interface variable device inserts, based on the interface type that the physical interface is presented as and the corresponding overhead information, an overhead block conforming to the overhead block format into the byte block stream mapped to the timeslots, to ensure that the byte block stream on which the overhead processing has been performed can be identified by a receive end device, thereby supporting different interface types.

In a possible implementation, the predetermined byte length is 16 bytes.

The obtaining, by the interface variable device, a byte block stream includes:

segmenting, by the interface variable device, an optical data unit-k (ODUk) frame into the 16-byte byte blocks, to obtain the byte block stream, where the ODUk frame is obtained by mapping a client signal.

The interface variable device maps an input client signal to an ODUk container, and then uniformly segments an ODUk frame in the ODUk container into 16-byte byte blocks, to form a 16-byte byte block stream. During subsequent timeslot mapping, the 16-byte byte blocks are mapped to the timeslots. In this embodiment, an intermediate layer on which a 16-byte block is used as a unit is introduced, and different frame structures are divided into 16-byte based byte block streams, thereby decoupling a client service from the physical interface.

In a possible implementation, the performing of overhead processing on the distributed byte block stream based on the overhead information and the overhead block format includes:

when the interface type is an OTUk interface, inserting, by the interface variable device, one overhead block into the distributed byte block stream at an interval of 238 byte blocks, where the overhead block conforms to a standard OTUk overhead format;

when the interface type is an OTUCn interface, inserting, by the interface variable device, n overhead blocks into the distributed byte block stream at an interval of n*238 byte blocks; or when the interface type is a FlexO interface, inserting, by the interface variable device, ten overhead blocks into the distributed byte block stream at an interval of 5130 byte blocks, where the overhead blocks conform to a standard FlexO overhead format.

Because frame structures of an OTUk frame, an OTUCn frame, and a FlexO frame are different, when performing the overhead processing on the byte block stream mapped to the timeslots, the interface variable device inserts an overhead block (corresponding to the interface type that the physical interface is presented as) corresponding to a frame structure, into the byte block stream based on bytes and areas that are occupied by overheads in different frame structures, to ensure that the receive end device can restore the corresponding frame structure based on the byte block stream that is output by the interface variable device, thereby supporting different interface types.

In a possible implementation, the predetermined byte length is 16 bytes.

The obtaining, by the interface variable device, of a byte block stream includes:

mapping, by the interface variable device, 64 consecutive 66 b code blocks in a 66 b code block stream to 33 byte blocks, to obtain the byte block stream.

The performing, by the interface variable device, of overhead processing on the distributed byte block stream based on the overhead information and the overhead block format includes:

when the interface type is a non-standard Ethernet interface, inserting, by the interface variable device, one overhead block into the distributed byte block stream at a predetermined insertion interval.

In addition to optical network transmission interface types such as the OTUk interface, the OTUCn interface, and the FlexO interface, the physical interface of the interface variable device may further be presented as an Ethernet interface. When receiving the 66 b code block stream from an Ethernet layer, the interface variable device maps the 64 consecutive 66 b code blocks to the 33 16-byte byte blocks, to obtain the byte block stream, thereby mapping the byte block stream to the corresponding timeslots, and facilitating the subsequent transmission performed by using the physical interface. In addition, when the physical interface is presented as the non-standard Ethernet interface, the interface variable device inserts, based on a requirement, the overhead block into the byte block stream mapped to the timeslots, to meet a requirement on overhead monitoring.

In a possible implementation, the byte block stream is converted from a 66 b code block stream that is output after flexible Ethernet (FlexE) completes shim processing.

The performing, by the interface variable device, of overhead processing on the distributed byte block stream based on the overhead information and the overhead block format includes:

when the FlexE is not bound with a plurality of physical interfaces, inserting one overhead block at an interval of 238 byte blocks, where the overhead block conforms to a standard OTUk overhead format;

when the FlexE is bound with a plurality of physical interfaces, inserting ten overhead blocks at an interval of 5130 byte blocks, where the overhead blocks conform to a standard FlexO overhead format.

When the 66 b code block stream obtained after the FlexE completes the shim processing is used as an input of the interface variable device, the interface variable device first converts the 66 b code block stream into the 16-byte byte block stream, maps the byte block stream to the timeslots, and then performs, based on an interface binding status of the FlexE, the corresponding overhead processing on the byte block stream mapped to the timeslots, so that the physical interface of the interface variable device can change, based on a configuration, the interface type that the physical interface is presented as. Optionally, when the FlexE is bound with the plurality of interfaces, the interface variable device may not insert the overhead block into the byte block stream, so that the physical interface is presented as a standard FlexE interface.

According to a second aspect, a method for transmission using an interface is provided. The method for transmission using an interface is applied to an interface variable device, and includes:

receiving, by the interface variable device by using a physical interface, a byte block stream mapped to timeslots, where each timeslot corresponds to one byte block, and the byte block is of a predetermined byte length;

processing, by the interface variable device based on an interface type of a physical interface, the byte block stream mapped to the timeslots;

for the processed byte block stream mapped to the timeslots, demapping, by the interface variable device, the corresponding byte blocks from the timeslots, to obtain the byte block stream; and restoring, by the interface variable device, the byte block stream to service data.

In an inverse process of byte stream transmission, after receiving the byte block stream mapped to the timeslots, the interface variable device processes, based on the interface type of the physical interface, the byte block stream mapped to the timeslots, and further demaps the byte block stream from the corresponding timeslots, to restore the service data based on the byte block stream, thereby receiving the service data.

In a possible implementation, the byte block stream mapped to the timeslots includes an overhead block.

The processing, by the interface variable device based on an interface type of a physical interface, of the byte block stream mapped to the timeslots includes:

identifying, by the interface variable device based on the interface type, data blocks and the overhead block that are included in the byte block stream mapped to the timeslots; and performing, by the interface variable device based on the data blocks and the overhead block, overhead removal processing on the byte block stream mapped to the timeslots.

When the overhead processing has been performed on the output byte block stream, the interface variable device further identifies, based on the interface type of the physical interface, the overhead block included in the byte block stream, and removes the overhead block, thereby ensuring accuracy of restoring the byte block stream.

In a possible implementation, the predetermined byte length is 16 bytes.

The identifying, by the interface variable device based on the interface type, of data blocks and the overhead block that are included in the byte block stream mapped to the timeslots includes:

when the interface type is an OTUk interface, extracting one overhead block at an interval of 238 data blocks, where the overhead block conforms to a standard OTUk overhead format;

when the interface type is an OTUCn interface, extracting n overhead blocks at an interval of n*238 data blocks; or when the interface type is a FlexO interface, extracting ten overhead blocks at an interval of 5130 data blocks, where the overhead blocks conform to a standard FlexO overhead format.

For example, when the physical interface is an OTN transmission interface such as the OTUk interface, the OTUCn interface, or the FlexO interface, the interface variable device determines overhead information of the overhead block and an overhead block format based on the interface type, to identify the data blocks and the overhead block that are included in the byte block stream, and then removes the identified overhead block, to restore the service data.

In a possible implementation, the identifying, by the interface variable device based on the interface type, of data blocks and the overhead block that are included in the byte block stream mapped to the timeslots includes:

when the interface type is a non-standard Ethernet interface, extracting, by the interface variable device, one overhead block at an interval of a predetermined quantity of data blocks.

The method further includes:

demapping, by the interface variable device, 64 66 b code blocks from 33 consecutive data blocks, to obtain a 66 b code block stream.

In this embodiment, when the physical interface presented by the interface variable device is the non-standard Ethernet interface, one overhead block is identified at the interval of the predetermined quantity of data blocks based on preset overhead information of the non-standard Ethernet interface, and the identified overhead block is removed, to demap the 64 66 b code blocks from the 33 consecutive data blocks, and further restore the 66 b code block stream, thereby restoring service data of an Ethernet layer.

According to a third aspect, an apparatus for transmission using an interface is provided. The apparatus is applied to an interface variable device and has a function of implementing the method for transmission using an interface according to any one of the first aspect and the possible implementations of the first aspect. The function may be implemented by hardware or may be implemented by hardware executing corresponding software. The hardware or software includes one or more units corresponding to the foregoing function.

According to a fourth aspect, an apparatus for transmission using an interface is provided. The apparatus is applied to an interface variable device and has a function of implementing the method for transmission using an interface according to any one of the second aspect and the possible implementations of the second aspect. The function may be implemented by hardware or may be implemented by hardware executing corresponding software. The hardware or software includes one or more units corresponding to the foregoing function.

According to a fifth aspect, an interface variable device is provided. The interface variable device includes: a processor, a memory connected to the processor, and an optical transceiver component. The processor executes a program or an instruction stored in the memory to implement the method for transmission using an interface according to the first aspect.

According to a sixth aspect, an interface variable device is provided. The interface variable device includes: a processor, a memory connected to the processor, and an optical transceiver component. The processor executes a program or an instruction stored in the memory to implement the method for transmission using an interface according to the second aspect.

BRIEF DESCRIPTION OF DRAWINGS

FIG. 4 is a schematic diagram of a frame structure of an OTUk frame;

DESCRIPTION OF EMBODIMENTS

To make the objectives, technical solutions, and advantages clearer, the following further describes the implementations in detail with reference to the accompanying drawings.

Figure 1:
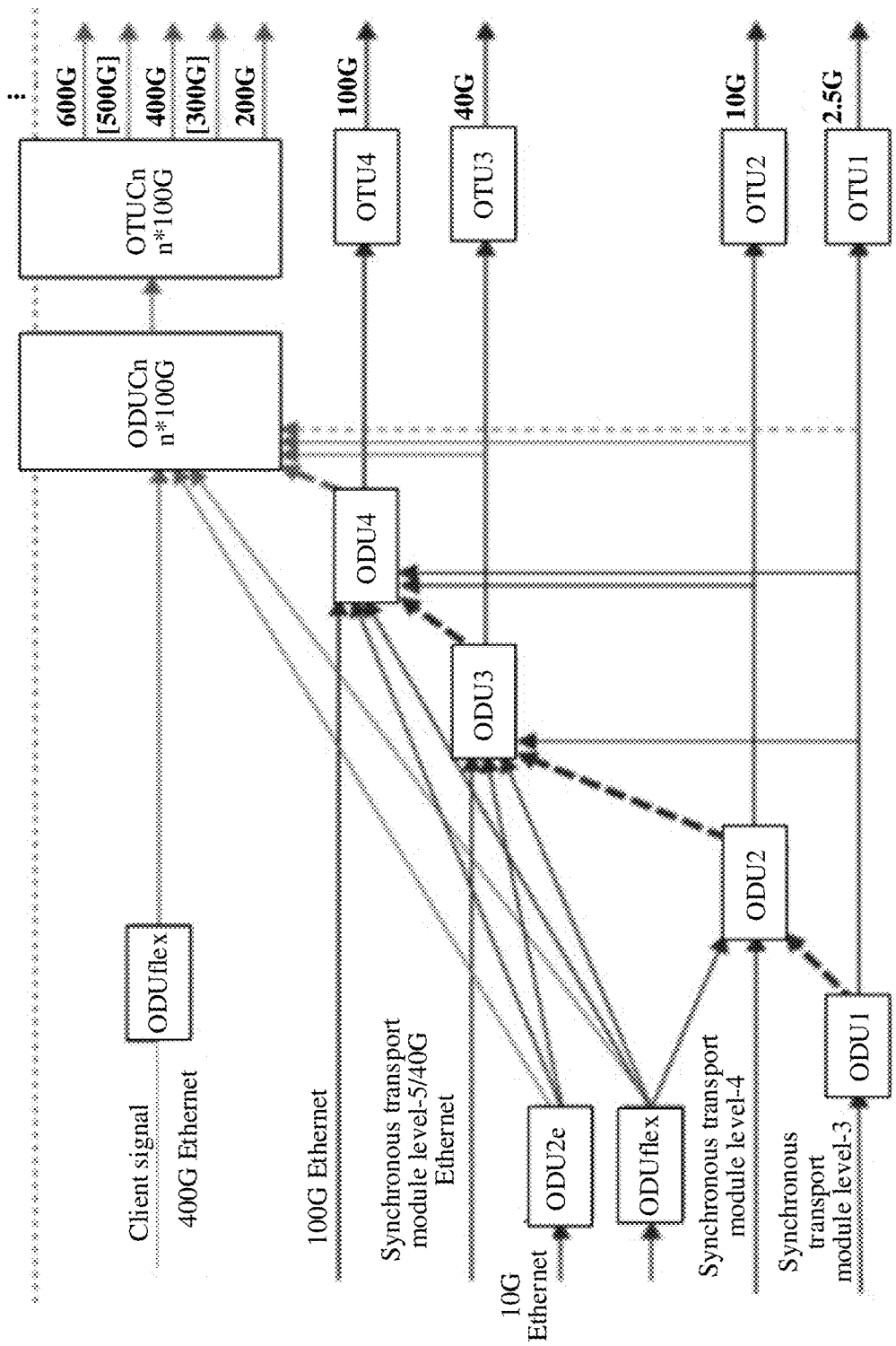
FIG. 1 is a diagram of mapping paths between different types of transmission interfaces.

With continuous increase of transmission interface types in an OTN, mapping relationships between different transmission interfaces become more complex, causing an increasingly complex OTN transmission system. For example, in the related art, mapping paths among an ODU1 (2.5 Gbps), an ODU2 (10 Gbps), an ODU3 (40 Gbps), an ODU4 (100 Gbps), and an ODUCn (n*100 Gbps) are shown in FIG. 1.

To resolve a problem that the transmission system becomes complex due to extension of the transmission interface types, the embodiments provide a method for transmission using an interface applied to an interface variable device. Optionally, the interface variable device may be implemented as an OTN device presenting different interface types, and the interface types presented by the OTN device include at least one of an OTUk interface, an OTUCn interface, or a FlexO interface. In another possible implementation, a physical interface of the interface variable device may alternatively be presented as an Ethernet interface, a FlexE interface, or the like.

Figure 2:
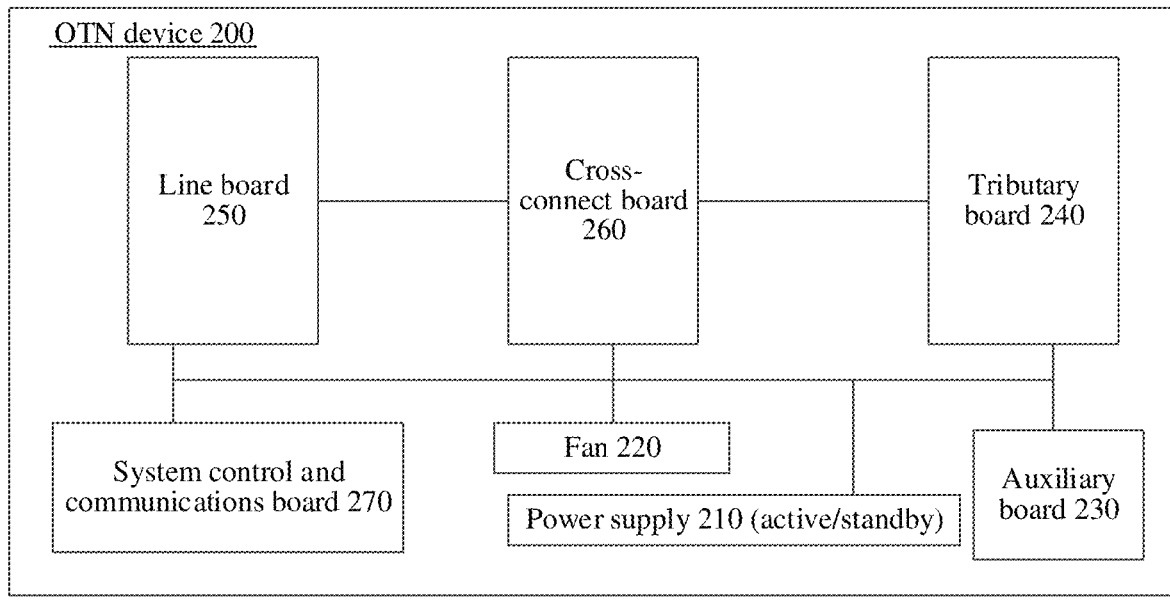
FIG. 2 is a structural diagram of hardware of an OTN device according to a schematic embodiment.

For example, FIG. 2 is a structural diagram of hardware of an OTN device 200. For example, the OTN device 200 includes a power supply 210, a fan 220, and an auxiliary board 230, and may further include a tributary board 240, a line board 250, a cross-connect board 260, an optical processing board, and a system control and communications board 270. It can be noted that each device may include different board types and a different quantity of boards based on a specific requirement. For example, a network device serving as a core node may have no tributary board 240. A network device serving as an edge node may have a plurality of tributary boards 240. The power supply 210 is configured to supply power to the OTN device 200, and may include an active power supply and a standby power supply. The fan 220 is configured to dissipate heat of the device. The auxiliary board 230 is configured to provide an auxiliary function such as providing an external alarm or accessing an external clock. The tributary board 240, the cross-connect board 260, and the line board 250 are mainly configured to process an electrical signal (referred to as an ODU signal, an OTN frame, or an ODU data frame below) of an OTN. The tributary board 240 is configured to receive and send various client services, such as an SDH service, a packet service, an Ethernet service, and a forward service. Further, the tributary board 240 may be classified into a client-side optical module and a signal processor. The client-side optical module may be an optical transceiver, configured to receive and/or send a client signal. The signal processor is configured to map the client signal to an ODU frame and demap the client signal from the ODU frame. The cross-connect board 260 is configured to switch an ODU frame, and complete switching of one or more types of ODU signals. The line board 250 mainly processes an ODU frame on a line side. For example, the line board 250 may be classified into a line-side optical module and a signal processor. The line-side optical module may be a line-side optical transceiver, configured to receive and/or send an ODU signal. The signal processor is configured to multiplex and demultiplex, or map and demap the ODU frame on the line side. The system control and communications board 270 is configured to implement system control and communication. For example, the system control and communications board 270 may collect information from different boards by using a backplane, or send a control instruction to a corresponding board. It can be noted that, unless particularly specified, there may be one or more specific components (for example, one or more signal processors). This is not limited. It can further be noted that, types of the boards included in the device, specific function designs of the boards, and a quantity of the boards are not limited in the embodiments.

Figure 3:
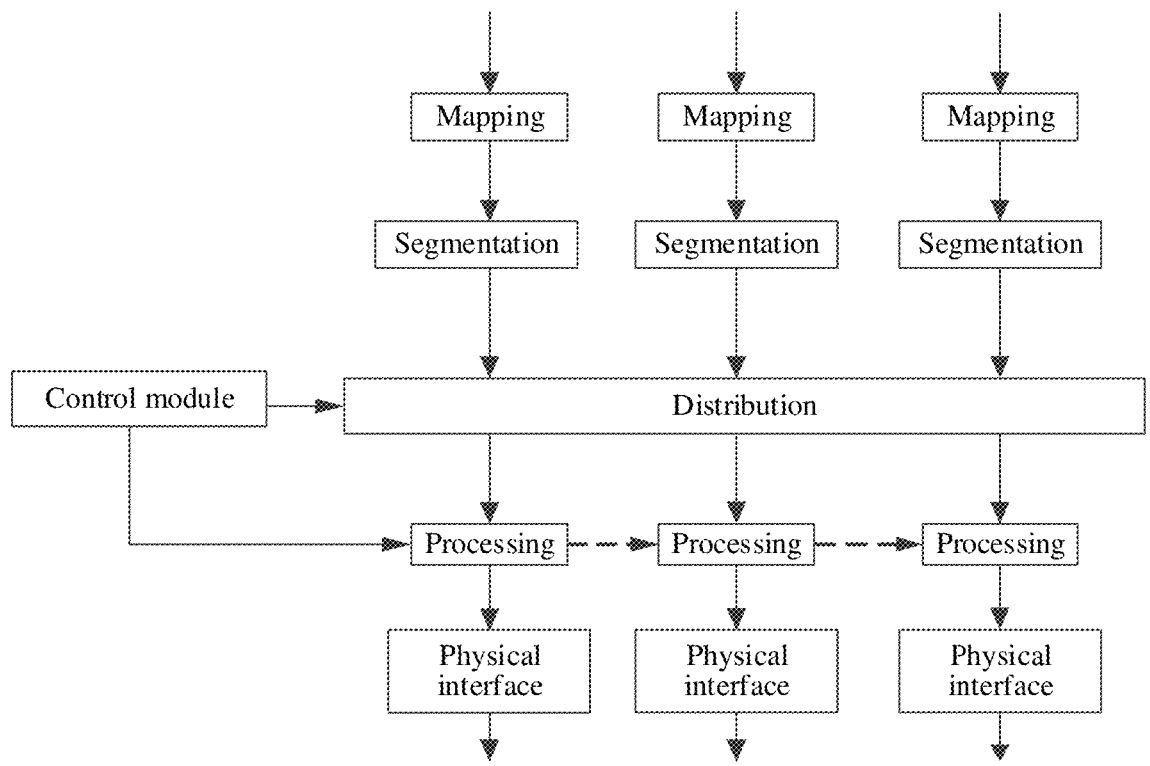
FIG. 3 is a schematic principle diagram of a method for transmission using an interface according to a schematic embodiment.

In the embodiments, an intermediate layer is introduced to the interface variable device. As shown in FIG. 3, after mapping different client signals to different ODUk frames, the interface variable device segments the ODUk frames into byte blocks of a predetermined byte length, to obtain byte block streams, and maps the byte block streams to corresponding timeslots at the intermediate layer. Further, the interface variable device distributes, to various physical interfaces by using the intermediate layer, the byte block streams mapped to the timeslots; before performing transmission by using a physical interface, performs, by using a control module based on an interface type of the physical interface corresponding processing (for example, overhead processing) on the byte block streams mapped to the timeslots; and outputs the processed byte block streams by using the physical interfaces. Original complex mapping paths and a complex hierarchy structure are simplified through byte block division and timeslot mapping and distribution at the intermediate layer, to avoid that complexity of a transmission system increases along with extension of transmission interface types.

For a byte length of the byte block and a specific division manner, in a possible implementation, the interface variable device uniformly segments, into a 16-byte byte blocks, an ODUk frame mapped into an ODUk container.

For example, as shown in FIG. 4, an existing OTUk frame is of a block frame structure with four rows and 4080 columns. The $1^{st}$ to the $7^{th}$ columns in the $1^{st}$ row are frame alignment bytes (FAS), and the $8^{th}$ to the $14^{th}$ columns in the $1^{st}$ row are an OTUk overhead, the $1^{st}$ to the $14^{th}$ columns in the $2^{nd}$ to the $4^{th}$ rows are an ODUk overhead, the $15^{th}$ and the $16^{th}$ columns in the $1^{st}$ to the $4^{th}$ rows are an OPUk overhead, the $17^{th}$ to the $3824^{th}$ columns are a payload, and the $3825^{th}$ to the $4080^{th}$ columns are an OTUk forward error correction area (FEC). OTN transmission interfaces of different rates can be implemented by configuring different frame frequencies. Compared with the OTUk frame, an ODUk frame lacks the final OTUk FEC area, and is of a block frame structure (including an OTUk OH area that is not processed) with four rows and 3824 columns.

Figure 5:
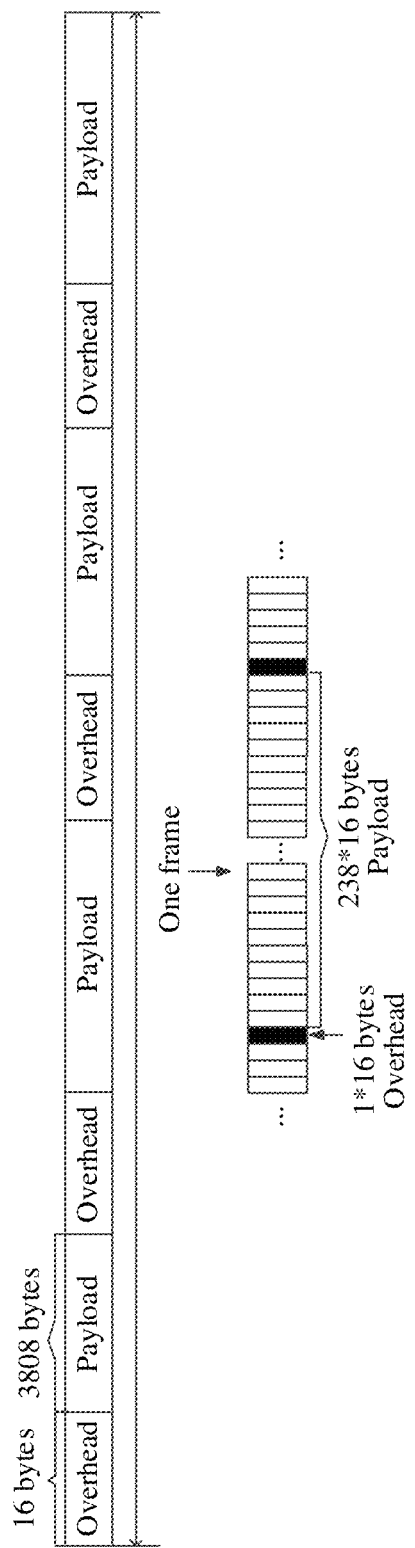
FIG. 5 is a schematic diagram of implementation of segmenting an OTUk frame into a byte block stream.

Using the ODUk frame as an example, when the ODUk frame is sent in order from left to right and from top to bottom, the block frame structure is converted into a row structure. As shown in FIG. 5, an overhead of the ODUk frame occupies 16 bytes, and a payload occupies 3808 bytes (where because the OTUk frame includes an FEC overhead of 256 columns, the payload occupies 4064 bytes).

The 3808 bytes may be divided into 238*16 bytes. Therefore, as shown in FIG. 5, when the ODUk frame is divided by using 16 bytes, the ODUk frame may be divided into one 16-byte overhead and 238 16-byte payloads, and segmenting a frame is completed after the division is repeated for four times.

Figure 6:
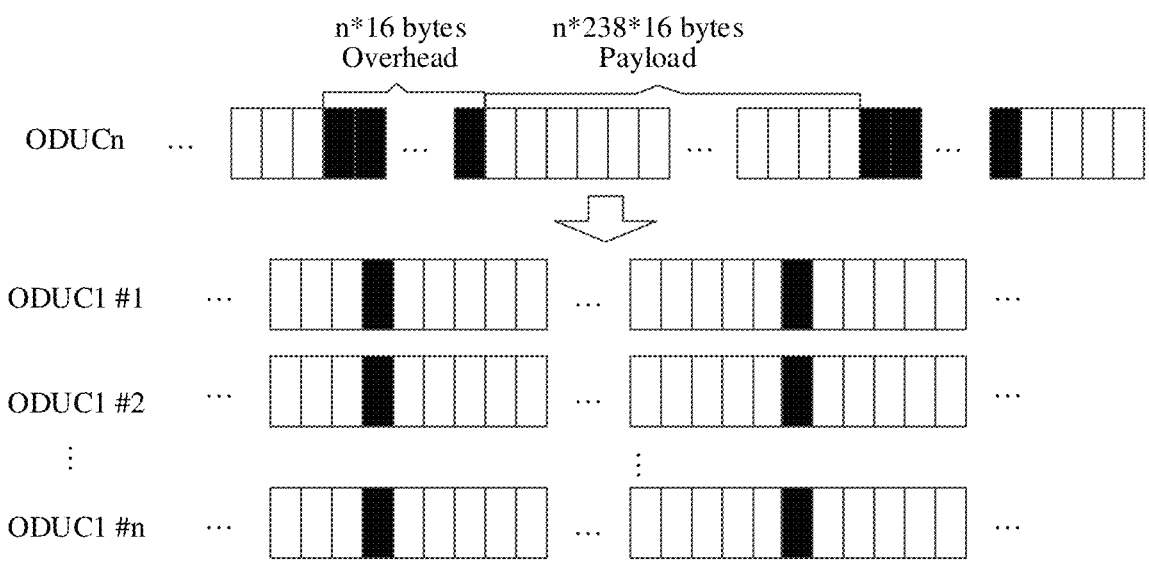
FIG. 6 is a schematic diagram of implementation of segmenting an OTUCn frame into a byte block stream.

For an ODUCn frame, the ODUCn frame is obtained through interleaving of n ODUC1s, and a frame structure of the ODUC1 frame is the same as that of the ODUk frame. Therefore, as shown in FIG. 6, when the ODUCn frame is divided by using 16 bytes, the ODUCn frame may be divided into n 16-byte overheads and n*238 16-byte payloads, and a complete frame is formed after the division is repeated for four times.

Figure 7:
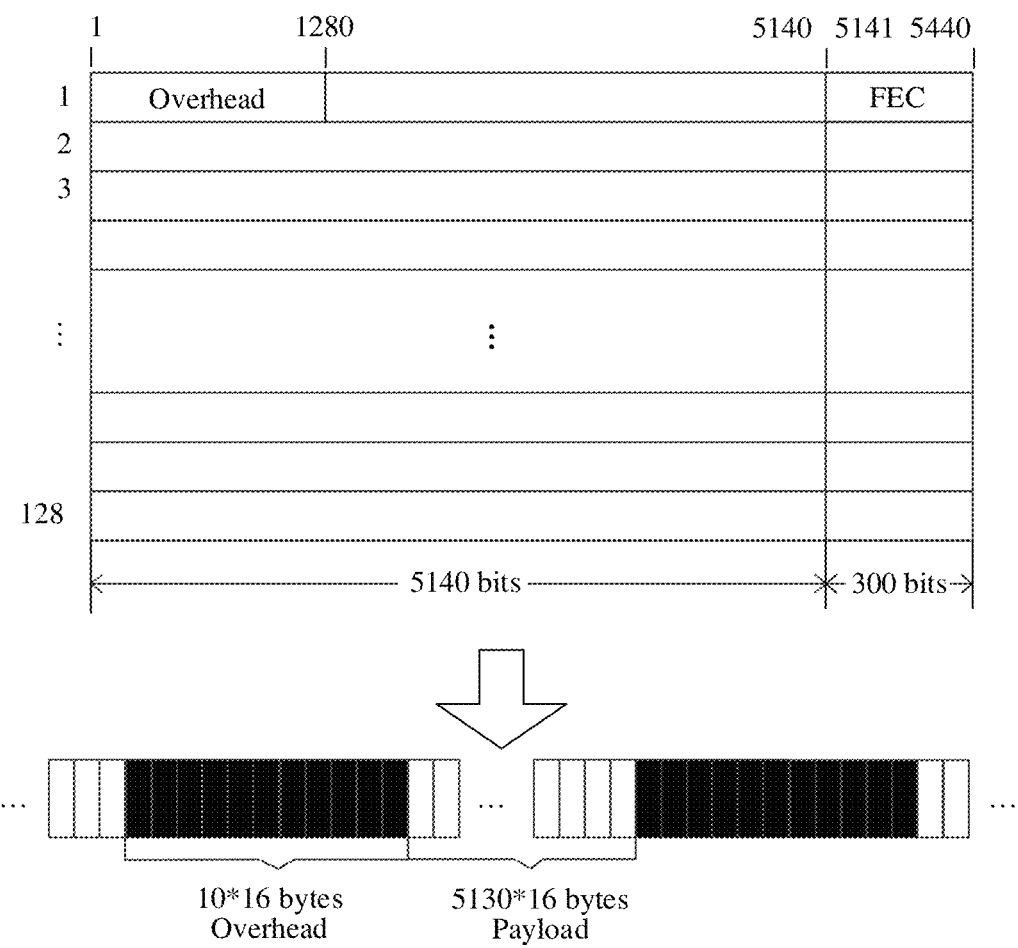
FIG. 7 is a schematic diagram of implementation of segmenting a FlexO frame into a byte block stream.

Different from the frame structure of the ODUk frame, as shown in FIG. 7, a FlexO frame is of a block frame structure with 128 rows and 680 columns (where in each column, one byte=eight bits). The first 160 columns in the $1^{st}$ row are a FlexO overhead, the last 300 bits in each row are FEC, and a remaining area is a payload. Correspondingly, when the FlexO frame is divided by using 16 bytes, the FlexO frame may be divided into an overhead of 10*16 bytes and a payload of 5130*16 bytes (excluding the FEC).

It can be learned that, the ODUk frame, the OTUk frame, the ODUCn frame, an OTUCn frame, and the FlexO frame all can be divided into 16-byte based byte block streams. It can be noted that, in another possible implementation, the foregoing frame structures may alternatively be divided into byte block streams based on another granularity such as eight bytes or four bytes. For ease of description, in the embodiments, division based on 16 bytes is merely used as an example for description, and constitutes no limitation.

Figure 8:
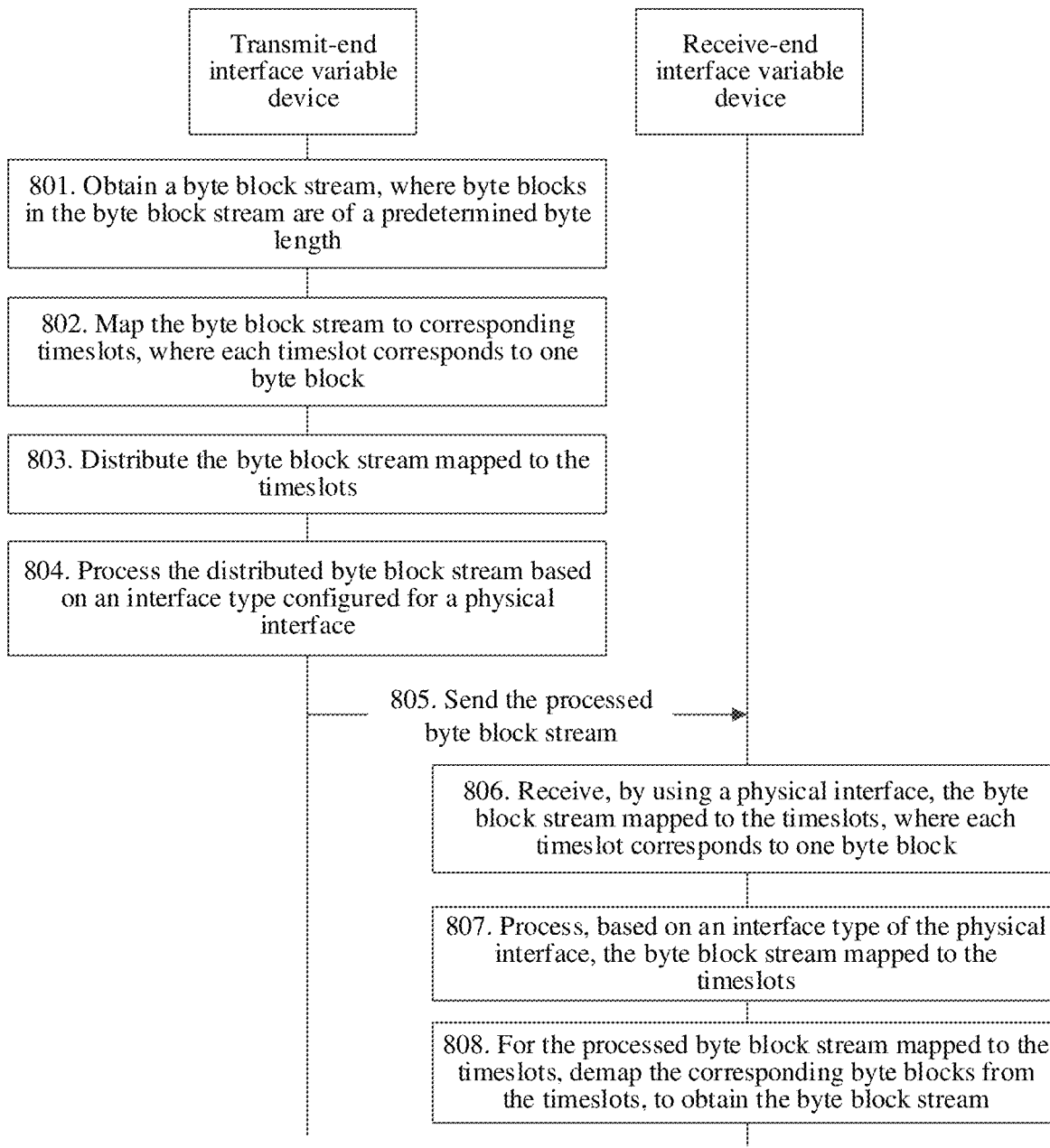
FIG. 8 is a flowchart of a method for transmission using an interface according to an example of an embodiment.

FIG. 8 is a flowchart of a method for transmission using an interface according to an example of an embodiment. This embodiment is described by using an example in which the method for transmission using an interface is applied to a system for transmission using an interface. The system for transmission using an interface includes a transmit-end interface variable device and a receive-end interface variable device. The transmit-end interface variable device and the receive-end interface variable device are connected to each other by using physical interfaces. The method may include the following steps.

Step 801. The transmit-end interface variable device obtains a byte block stream, where byte blocks in the byte block stream are of a predetermined byte length.

Optionally, the byte block stream is directly obtained by the interface variable device, or is obtained by the interface variable device by converting a received client signal. The client signal may be an Ethernet service signal or a constant bit rate (CBR) service signal.

In a possible implementation, the transmit-end interface variable device receives the client signal, maps the client signal to an ODUk frame in an existing mapping manner, and further segments the ODUk frame based on the preset byte length, to obtain the byte block stream.

Step 802. The transmit-end interface variable device maps the byte block stream to corresponding timeslots, where each timeslot corresponds to one byte block.

In this embodiment, an intermediate layer is introduced to the transmit-end interface variable device. When obtaining the byte block stream, the transmit-end interface variable device maps the byte blocks in the byte block stream to corresponding timeslot locations at the intermediate layer.

To meet a transmission rate of a finally presented interface type, the transmit-end interface variable device first determines, based on the interface type that the physical interface is to be presented as, a timeslot size of a timeslot organization at the intermediate layer and a quantity of timeslots in each timeslot period, and then maps the byte block stream to the corresponding timeslot locations.

In a possible implementation, the transmit-end interface variable device determines, based on the interface type that the physical interface is to be presented as, that the timeslot organization at the intermediate layer is 5 G (5 Gbps) timeslots, in other words, each byte block occupies one 5 G timeslot. When the transmission rate of the interface type that the physical interface is presented as is 40 G, the transmit-end interface variable device determines that the corresponding quantity of timeslots in each timeslot period is 8, that is, each timeslot period occupies eight timeslots at the intermediate layer.

Step 803. The transmit-end interface variable device distributes the byte block stream mapped to the timeslots.

In a possible implementation, after completing timeslot mapping, the intermediate layer of the transmit-end interface variable device performs, through polling or full cross-connect, multipath distribution on the byte block stream mapped to the timeslots. Different distribution paths correspond to different physical interfaces.

Step 804. The transmit-end interface variable device processes the distributed byte block stream based on an interface type configured for the physical interface.

Further, after distributing the byte block stream mapped to the timeslots, the transmit-end interface variable device does not directly transmit the byte block stream, but further determines, based on the interface type that the physical interface is presented as, whether to perform overhead processing on the distributed byte block stream, and inserts an overhead block into the distributed byte block stream when the overhead processing is required.

In a possible implementation, when the interface type is an OTN interface such as an OTUk interface, an OTUCn interface, or a FlexO interface, because an OTN frame structure includes an overhead, the transmit-end interface variable device inserts the overhead block into the distributed byte block stream based on overhead information and an overhead block format that correspond to the interface type. The overhead block is also of a byte length the same as that of the byte block.

In another possible implementation, when the interface type is a standard Ethernet interface or a standard flexible Ethernet interface, the transmit-end interface variable device does not need to perform overhead processing on the distributed byte block stream. When the interface type is a non-standard Ethernet interface, the interface variable device inserts one overhead block at an interval of a predetermined quantity of byte blocks based on a preset insertion interval, to implement overhead monitoring.

Step 805. The transmit-end interface variable device sends the processed byte block stream.

Further, the transmit-end interface variable device transmits the processed byte block stream to the receive-end interface variable device by using the physical interface.

Optionally, for frame structures such as an OTUk and a FlexO that have an FEC area, before transmitting the processed byte block stream by using the physical interface, the transmit-end interface variable device further needs to perform FEC processing on the processed byte block stream. In a possible implementation, the transmit-end interface variable device inserts an FEC byte block into the byte block stream based on the interface type and according to a preset insertion rule. This is not limited in this embodiment.

Step 806. The receive-end interface variable device receives, by using the physical interface, the byte block stream mapped to the timeslots, where each timeslot corresponds to one byte block, and the byte block is of the predetermined byte length.

The receive-end interface variable device connected to the transmit-end interface variable device receives, by using the physical interface of the receive-end interface variable device, the byte block stream mapped to the timeslots, and the receive-end interface variable device is configured to restore service data based on a received byte block stream.

The physical interface of the receive-end interface variable device is a variable physical interface, and a configured interface type is consistent with the interface type of the transmit-end interface variable device.

In another possible implementation, when the physical interface of the receive end device is an invariable physical interface, and an interface type of the invariable interface is consistent with the interface type of the transmit-end interface variable device, for example, when the physical interface presented by the transmit-end interface variable device is the OTUk interface, a standard OTUk interface is configured for the receive end device.

It can be noted that, when the physical interface is the OTUk interface, the OTUCn interface, or the FlexO interface, in a receiving process, the receive-end interface variable device performs FEC removal processing on the byte block stream mapped to the timeslots. Details are not described in this embodiment.

Step 807. The receive-end interface variable device processes, based on the interface type of the physical interface, the byte block stream mapped to the timeslots.

Corresponding to step 804, when the physical interface is the OTUk interface, the OTUCn interface, the FlexO interface, or the non-standard Ethernet interface, the receive-end interface variable device further needs to perform overhead removal processing on the mapped byte block stream.

In a possible implementation, the receive-end interface variable device identifies, based on the interface type of the receive-end interface variable device, the overhead block and data blocks (such as, a payload) that are included in the byte block stream mapped to the timeslots, to remove the identified overhead block, so that the processed byte block stream includes only the data blocks.

Step 808. For the processed byte block stream mapped to the timeslots, the receive-end interface variable device demaps the corresponding byte blocks from the timeslots, to obtain the byte block stream.

Opposite to step 802, after completing the overhead removal processing on the byte block stream, the receive-end interface variable device extracts the byte blocks carried in the timeslots, to obtain the byte block stream corresponding to the service data (that is, to restore the byte block stream obtained by the transmit-end interface variable device in step 801), thereby receiving and restoring the service data. The byte blocks in the byte block stream are of the predetermined byte length.

For example, when a 16-byte block in the timeslot organization of the transmit-end interface variable device is a 5 G timeslot, the receive-end interface variable device extracts 16-byte byte blocks from 5 G timeslots, to obtain a 16-byte byte block stream.

In an implementation process, when the transmit-end interface variable device is implemented as an OTN device, that is, when the physical interface of the transmit-end interface variable device is presented as an OTN transmission interface, before transmission is performed by using the physical interface, the overhead processing further needs to be performed on the byte block stream mapped to the timeslots at the intermediate layer. Descriptions are provided below by using a schematic embodiment.

Figure 9:
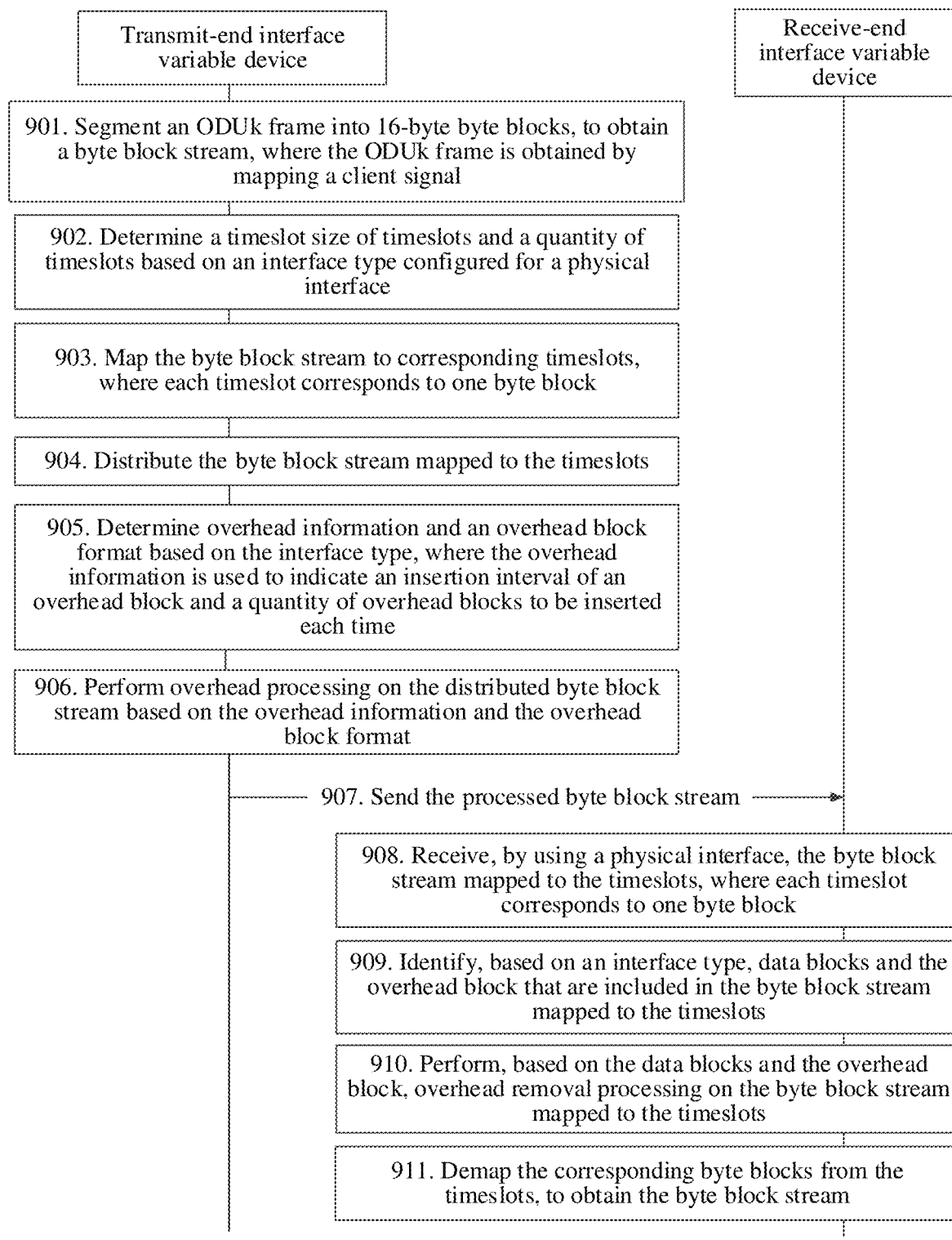
FIG. 9 is a flowchart of a method for transmission using an interface according to another example of an embodiment.

FIG. 9 is a flowchart of a method for transmission using an interface according to another example of an embodiment. The method may include the following steps.

Step 901. A transmit-end interface variable device segments an ODUk frame into 16-byte byte blocks, to obtain a byte block stream, where the ODUk frame is obtained by mapping a client signal.

In a possible implementation, after receiving a client signal, the transmit-end interface variable device maps the client signal to a corresponding ODUk frame in a corresponding mapping manner, and further uniformly divides the ODUk frame into segments. Optionally, for a client signal newly added in the future, the newly-added client signal may be adapted to an ODUflex. It can be noted that, the ODUk frame or the ODUflex frame is merely an example. In an application, an ODU data frame of another type may be selected based on a specific requirement.

When the client signal is a CBR signal, a method for mapping the client signal to the ODUk frame includes: an asynchronous mapping procedure (AMP), a bit-synchronous mapping procedure (BMP), a generic mapping procedure (GMP), and a transparent generic framing procedure (GFP-T). When the client signal is a PKT signal, a method for mapping the client signal to the ODUk frame includes: an idle mapping procedure (IMP) and a generic framing procedure-frame mapped (GFP-F). A specific manner of mapping the client signal to the ODUk frame is not limited.

Further, for the ODUk frame, the transmit-end interface variable device segments the ODUk frame into the 16-byte byte blocks, to obtain the byte block stream. A process of obtaining the byte blocks through segmentation is shown in FIG. 5, and details are not described in this embodiment.

Step 902. The transmit-end interface variable device determines a timeslot size of timeslots and a quantity of timeslots based on an interface type configured for a physical interface.

Before mapping the byte block stream to timeslot locations at an intermediate layer, the transmit-end interface variable device determines the timeslot size of the timeslots and the quantity of timeslots at the intermediate layer based on the interface type that the physical interface is to be presented.

For example, a transmission rate of the physical interface that needs to be currently presented is 40 Gbps. The transmit-end interface variable device determines that the interface type that needs to be presented is an OTU3, and the timeslot size of the timeslots at the intermediate layer is 5 G (that is, one 16-byte block is one 5 G timeslot). The transmit-end interface variable device calculates, based on the transmission rate and the timeslot size, that the quantity of timeslots occupied at the intermediate layer is 8*n (where n is a quantity of interfaces).

Optionally, when needing to support a 2.5 G timeslot, the transmit-end interface variable device extends a sub-slot through interleaving, that is, a 16-byte block is used as a 2.5 G timeslot (where one 5 G timeslot is divided into two 2.5 G sub-slots). In this case, a timeslot period is twice the timeslot period corresponding to the 5 G timeslot. For example, for a physical interface with a transmission rate of 40 Gbps, eight timeslots are used as one timeslot period for the 5 G timeslot, and 16 timeslots are used as one timeslot period for the 2.5 G timeslot.

Step 903. The transmit-end interface variable device maps the byte block stream to corresponding timeslots, where each timeslot corresponds to one byte block.

An implementation of this step is similar to that of step 802, and details are not described in this embodiment again.

Step 904. The transmit-end interface variable device distributes the byte block stream mapped to the timeslots.

An implementation of this step is similar to that of step 803, and details are not described in this embodiment again.

Step 905. The transmit-end interface variable device determines overhead information and an overhead block format based on the interface type, where the overhead information is used to indicate an insertion interval of an overhead block and a quantity of overhead blocks to be inserted each time.

When the interface type configured for the physical interface is an OTN transmission interface, the transmit-end interface variable device further performs overhead processing on the byte block stream mapped to the timeslots. For example, different types of OTN interfaces correspond to different overhead block formats, different quantities of overhead blocks, and different overhead block locations. Therefore, the transmit-end interface variable device first determines, based on the interface type, the overhead block format and the overhead information of the overhead block to be inserted.

The overhead information is used to indicate a manner of inserting the overhead block into the distributed byte block stream, and includes locations and a quantity of overhead blocks to be inserted. For example, the overhead information includes at least the insertion interval of the overhead block (where for example, one overhead block is inserted at an interval of m byte blocks) and the quantity of overhead blocks to be inserted each time (where for example, n overhead blocks are inserted each time). In another possible implementation, the overhead information may further include other information. Specific content included in the overhead information is not limited in this embodiment.

In a possible implementation, the interface variable device determines, based on the transmission rate presented by the physical interface, the interface type that the physical interface is to be presented as, performs overhead extraction and presentation based on an overhead block field definition delivered through programming and the overhead block format, and maps the received byte block stream to the corresponding timeslot locations at the intermediate layer and restores the corresponding timeslot locations at the intermediate layer based on delivered overhead content, and performs service processing based on a processing behavior delivered through programming.

Step 906. The transmit-end interface variable device performs overhead processing on the distributed byte block stream based on the overhead information and the overhead block format.

Further, the transmit-end interface variable device inserts the overhead block into the distributed byte block stream based on the determined overhead information and overhead block format, to complete the overhead processing. For different types of OTN interfaces, manners of performing the overhead processing by the transmit-end interface variable device are different. An OTUk interface, an OTUCn interface, and a FlexO interface are separately used as examples below for description. This step may include the following steps.

First, when the interface type is the OTUk interface, one overhead block is inserted into the distributed byte block stream at an interval of 238 byte blocks, where the overhead block conforms to a standard OTUk overhead format.

As shown in FIG. 5, an ODUk frame may be divided into one 16-byte overhead and 238 16-byte payloads (where the division is repeated for four times for each frame). Therefore, when the interface type is the OTUk interface, the transmit-end interface variable device determines that the overhead block format is the standard OTUk overhead format, and the determined overhead information indicates that one overhead block is inserted at the interval of 238 byte blocks. Therefore, one overhead block conforming to the standard OTUk overhead format is inserted into the distributed byte block stream at the interval of 238 byte blocks.

Optionally, when performing the overhead processing, the transmit-end interface variable device further completes service multiplexing by using a multiframe.

Figure 10:
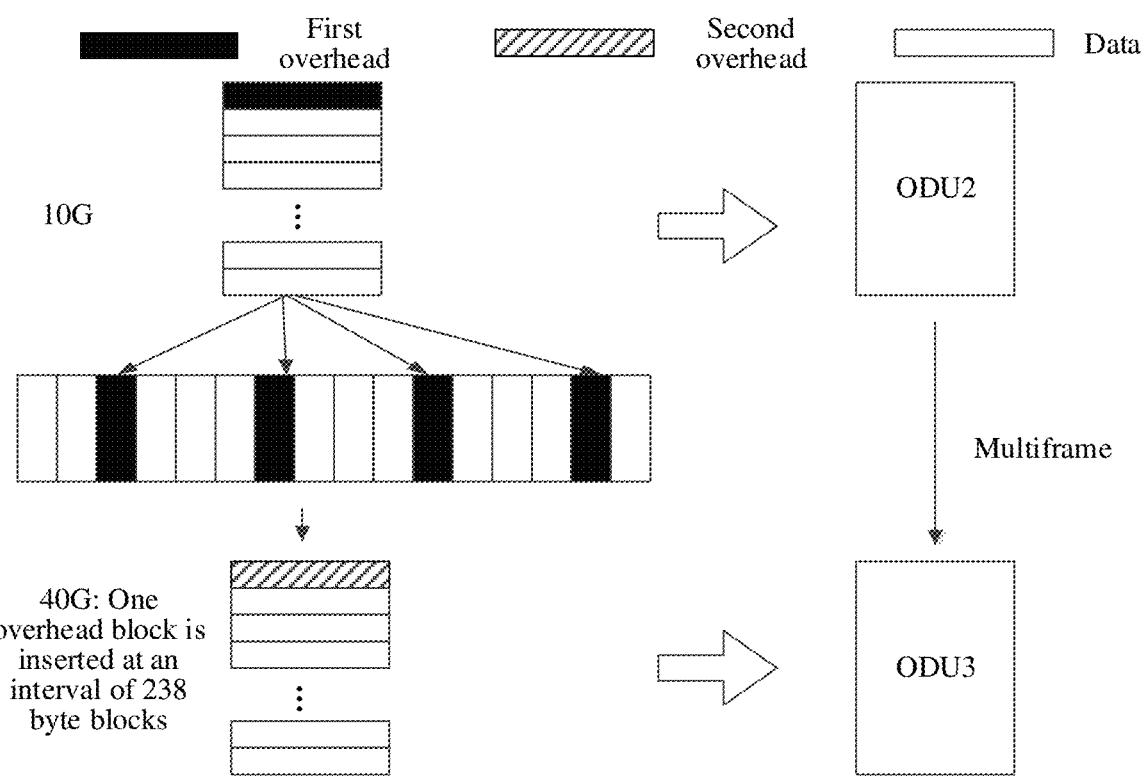
FIG. 10 is a schematic diagram of implementation of overhead processing when an interface type is an OTUk interface.

For example, as shown in FIG. 10, an ODUk container (for example, an ODU2, which includes a first overhead shown in FIG. 10) to which the client signal is mapped has a rate of 10 Gbps, and the transmission rate presented by the physical interface is 40 Gbps (for example, an ODU3), in other words, the physical interface can accommodate four services. Therefore, after performing multiplexing by using four OTN multiframes, the transmit-end interface variable device inserts one overhead block (that is, a second overhead shown in FIG. 10) at the interval of 238 bytes.

Second, when the interface type is the OTUCn interface, n overhead blocks are inserted into the distributed byte block stream at an interval of n*238 byte blocks.

As shown in FIG. 6, an ODUCn frame may be divided into n 16-byte overheads and n*238 16-byte payloads, the ODUCn is obtained through interleaving of ODUC1, and a structure of the ODUC1 is consistent with that of the ODUk. Therefore, when the interface type is the OTUCn interface, the transmit-end interface variable device determines that the overhead block format is the standard OTUk overhead format, and the determined overhead information indicates that n overhead blocks are inserted at the interval of n*238 byte blocks. Therefore, the n overhead blocks conforming to the standard OTUk overhead format are inserted into the distributed byte block stream at the interval of n*238 byte blocks.

Third, when the interface type is the FlexO interface, ten overhead blocks are inserted into the distributed byte block stream at an interval of 5130 byte blocks, where the overhead blocks conform to a standard FlexO overhead format.

As shown in FIG. 7, a FlexO frame may be divided into ten 16-byte overheads and 5130 16-byte payloads. Therefore, when the interface type is the FlexO interface, the transmit-end interface variable device determines that the overhead block format is the standard FlexO overhead format, and the determined overhead information indicates that ten overhead blocks are inserted at the interval of 5130 byte blocks. Therefore, ten overhead blocks conforming to the standard FlexO overhead format are inserted into the distributed byte block stream at the interval of 5130 byte blocks.

Optionally, when performing the overhead processing, the transmit-end interface variable device further completes service multiplexing by using a multiframe.

Figure 11:
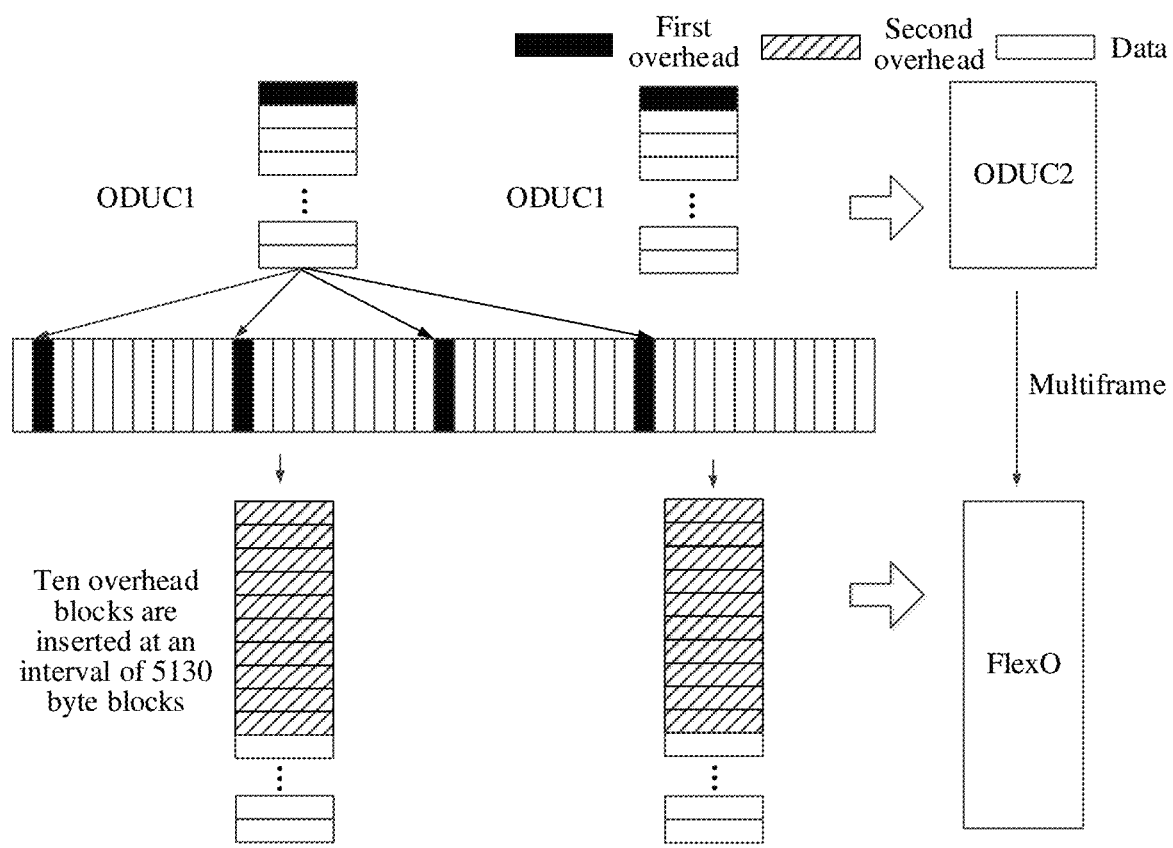
FIG. 11 is a schematic diagram of implementation of overhead processing when an interface type is a FlexO interface.

For example, as shown in FIG. 11, the client signal is an ODUC2 (i.e., in this embodiment, two ODUC1s, which includes first overheads shown in FIG. 11), and the interface type configured for the physical interface is the FlexO interface (n*100 G). Therefore, after multiplexing the ODUC1s by using a FlexO, the transmit-end interface variable device inserts ten overhead blocks (that is, second overheads shown in FIG. 10) at the interval of 5130 byte blocks.

Step 907. The transmit-end interface variable device sends the processed byte block stream.

Step 908. The receive-end interface variable device receives, by using a physical interface, the byte block stream mapped to the timeslots, where each timeslot corresponds to one byte block, and the byte block is of a predetermined byte length.

Implementations of step 907 and step 908 are similar to those of step 805 and step 806, and details are not described in this embodiment again.

Step 909. The receive-end interface variable device identifies, based on an interface type, data blocks and the overhead block that are included in the byte block stream mapped to the timeslots.

Opposite to step 905, when the physical interface of the receive-end interface variable device is the OTN interface, the receive-end interface variable device identifies, based on the interface type of the physical interface, the overhead block and the data blocks that are included in the byte block stream, to facilitate subsequent overhead removal processing based on the data blocks and the overhead block.

For the three interface types shown in step 905, this step may include the following steps.

First, when the interface type is the OTUk interface, one overhead block is extracted at an interval of 238 data blocks, where the overhead block conforms to the standard OTUk overhead format.

In a possible implementation, when the interface type of the physical interface of the receive-end interface variable device is the OTUk interface, the receive-end interface variable device identifies a byte block conforming to the standard OTUk overhead format in the byte block stream, determines the byte block as the overhead block, and further determines 238 byte blocks subsequent to the overhead block as the data blocks.

Second, when the interface type is the OTUCn interface, n overhead blocks are extracted at an interval of n*238 data blocks.

In a possible implementation, when the interface type of the physical interface of the receive-end interface variable device is the OTUCn interface, the receive-end interface variable device identifies n consecutive byte blocks conforming to the standard OTUk overhead format in the byte block stream, determines the n consecutive byte blocks as the n overhead blocks, and further determines n*238 byte blocks subsequent to the n overhead blocks as the data blocks.

Third, when the interface type is the FlexO interface, ten overhead blocks are extracted at an interval of 5130 data blocks, where the overhead blocks conform to the standard FlexO overhead format.

In a possible implementation, when the interface type of the physical interface of the receive-end interface variable device is the FlexO interface, the receive-end interface variable device identifies ten consecutive byte blocks conforming to the standard FlexO overhead format in the byte block stream, determines the ten consecutive byte blocks as the ten overhead blocks, and further determines 5130 byte blocks subsequent to the ten overhead blocks as the data blocks.

Step 910. The receive-end interface variable device performs, based on the data blocks and the overhead block, overhead removal processing on the byte block stream mapped to the timeslots.

With reference to the example in step 909, when the interface type is the OTUk interface, the receive-end interface variable device removes one overhead block at the interval of 238 data blocks. When the interface type is the OTUCn interface, the receive-end interface variable device removes n overhead blocks at the interval of n*238 data blocks. When the interface type is the FlexO interface, the receive-end interface variable device removes ten overhead blocks at the interval of 5130 data blocks.

After the overhead removal processing, the byte block stream mapped to the timeslots does not include the overhead block inserted by the transmit-end interface variable device.

Step 911. The receive-end interface variable device demaps the corresponding byte blocks from the timeslots, to obtain the byte block stream.

An implementation of this step is similar to that of step 808, and details are not described in this embodiment again.

In the embodiment shown in FIG. 9, an example in which the physical interface of the transmit-end interface variable device is the OTN transmission interface is used for description. In another possible implementation, the physical interface of the transmit-end interface variable device may alternatively be configured as an Ethernet interface. Descriptions are provided below by using a schematic embodiment.

Figure 12:
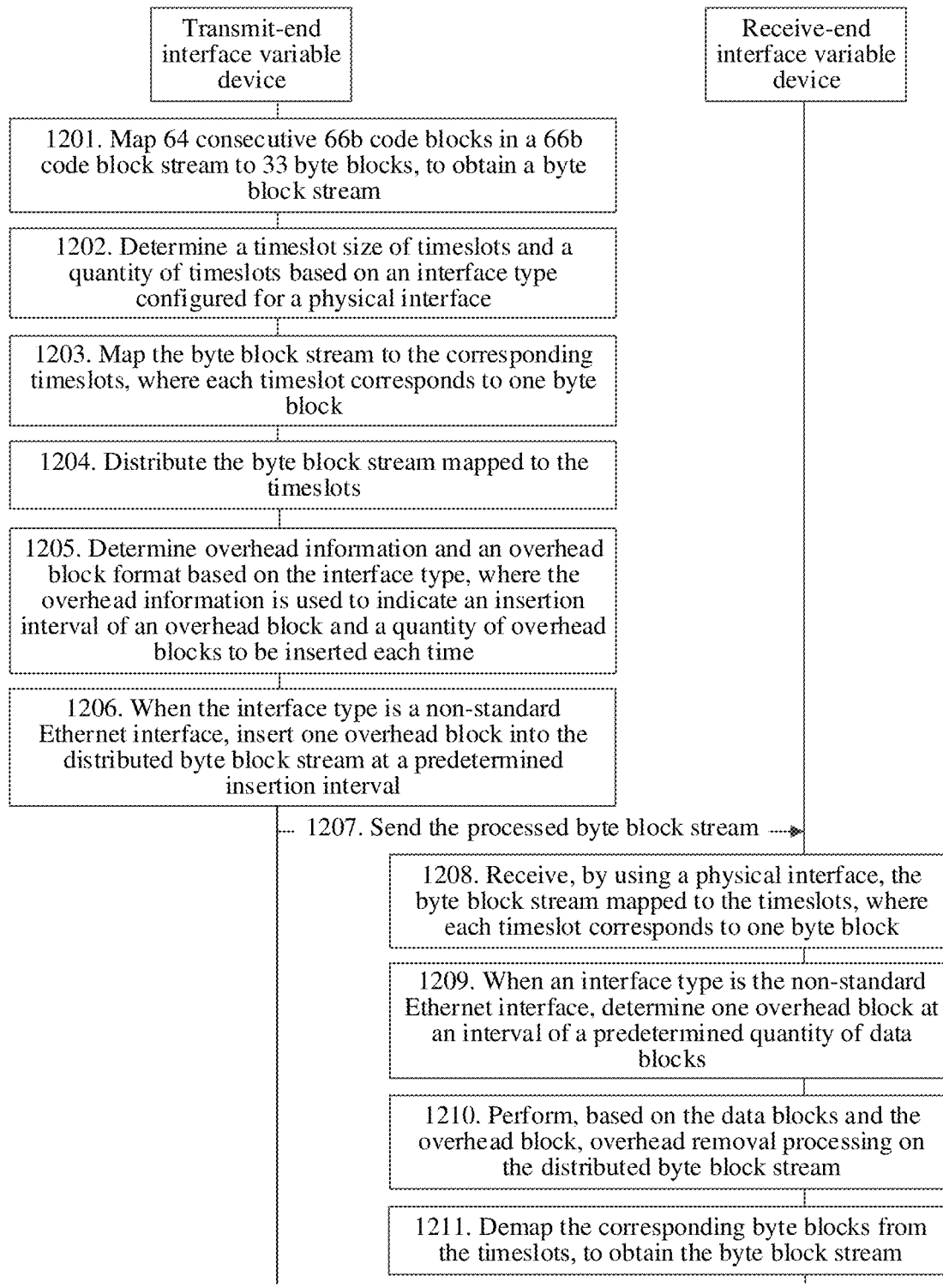
FIG. 12 is a flowchart of a method for transmission using an interface according to another example of an embodiment.

FIG. 12 is a flowchart of a method for transmission using an interface according to another example of an embodiment. The method may include the following steps.

Step 1201. A transmit-end interface variable device maps 64 consecutive 66 b code blocks in a 66 b code block stream to 33 byte blocks, to obtain a byte block stream.

Figure 13:
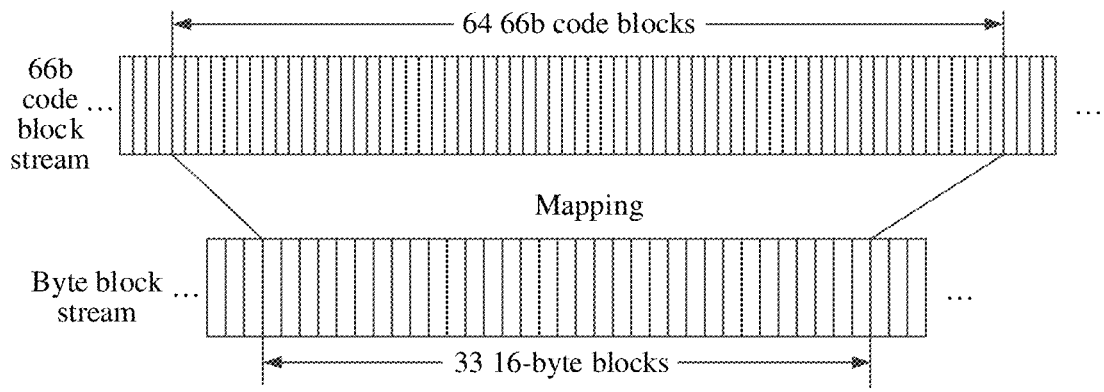
FIG. 13 is a schematic diagram of implementation of mapping a 66 b code block stream into a byte block stream.

To obtain the byte blocks through uniform 16-byte segmentation, when the transmit-end interface variable device receives the 66 b code block stream of an Ethernet physical coding sublayer (PCS), as shown in FIG. 13, the transmit-end interface variable device maps the 64 consecutive 66 b code blocks to the 33 16-byte byte blocks. Each 66 b code block is of 66 bits.

Step 1202. The transmit-end interface variable device determines a timeslot size of timeslots and a quantity of timeslots based on an interface type configured for a physical interface.

Step 1203. The transmit-end interface variable device maps the byte block stream to the corresponding timeslots, where each timeslot corresponds to one byte block.

Step 1204. The transmit-end interface variable device distributes the byte block stream mapped to the timeslots.

Implementations of step 1202 to step 1204 are similar to those of step 902 to step 904, and details are not described in this embodiment again.

Step 1205. The transmit-end interface variable device determines overhead information and an overhead block format based on the interface type, where the overhead information is used to indicate an insertion interval of an overhead block and a quantity of overhead blocks to be inserted each time.

In a possible implementation, to increase overhead monitoring (where a solution of adding monitoring information to a physical layer is easy to implement, and upper-layer monitoring is not required), when the interface type configured for the physical interface is a non-standard Ethernet interface, the transmit-end interface variable device performs, based on the preset overhead information and overhead block format, overhead processing on the byte block stream mapped to the timeslots. In this case, interconnection between the non-standard Ethernet interface and a standard Ethernet interface is unavailable.

Optionally, when the interface type configured for the physical interface is a standard Ethernet interface, the transmit-end interface variable device does not need to perform overhead processing.

Step 1206. When the interface type is the non-standard Ethernet interface, the transmit-end interface variable device inserts one overhead block into the distributed byte block stream at a predetermined insertion interval.

Further, the transmit-end interface variable device inserts one overhead block into the distributed byte block stream at the predetermined insertion interval based on the determined overhead information and overhead block format. For example, the transmit-end interface variable device inserts one overhead block at an interval 33 byte blocks.

It can be noted that a receive-end interface variable device connected to the transmit-end interface variable device learns of the overhead block format and the overhead information of the inserted overhead block, to ensure that service data can be restored.

Step 1207. The transmit-end interface variable device sends the processed byte block stream.

Figure 14:
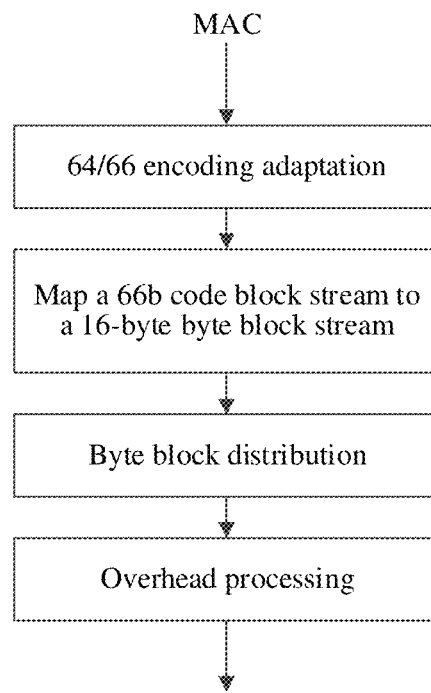
FIG. 14 is a schematic diagram of implementation of a presentation process of an Ethernet interface.

For example, a presentation process of an Ethernet interface is shown in FIG. 14. The transmit-end interface variable device receives a 66 b code block stream that is input at a MAC layer and on which 64/66 encoding adaptation is performed, maps the 66 b code block stream into a 16-byte byte block stream, to distribute, to the physical interface, the byte block stream mapped to the timeslots at an intermediate layer, and outputs, based on the interface type that the physical interface is presented as, the byte block stream on which overhead processing is performed.

Step 1208. The receive-end interface variable device receives, by using a physical interface, the byte block stream mapped to the timeslots, where each timeslot corresponds to one byte block, and the byte block is of a predetermined byte length.

An implementation of step 1208 is similar to that of step 908, and details are not described in this embodiment again.

Step 1209. When an interface type is the non-standard Ethernet interface, the receive-end interface variable device extracts one overhead block at an interval of a predetermined quantity of data blocks.

Similar to step 909, when the physical interface of the receive-end interface variable device is the non-standard Ethernet interface in communication with the transmit-end interface variable device, the receive-end interface variable device determines one overhead block at the interval of the predetermined quantity of data blocks based on the overhead block format and the insertion interval (that is, the overhead information) of the overhead block inserted by the transmit-end interface variable device, and identifies the overhead block and the data blocks in the byte block stream.

Step 1210. The receive-end interface variable device performs, based on the data blocks and the overhead block, overhead removal processing on the distributed byte block stream.

Further, the receive-end interface variable device removes the identified overhead block from the byte block stream mapped to the timeslots, to obtain the byte block stream that includes only the byte blocks and that is mapped to the timeslots.

Step 1211. The receive-end interface variable device demaps the corresponding byte blocks from the timeslots, to obtain the byte block stream.

An implementation of this step is similar to that of step 911, and details are not described in this embodiment again.

Optionally, when needing to further restore the 66 b code block stream, after demapping the byte block stream, the receive-end interface variable device demaps the 64 66 b code blocks from the 33 consecutive data blocks (which is, an inverse process shown in FIG. 13), to obtain the 66 b code block stream.

In a possible implementation, when the byte block stream obtained by the transmit-end interface variable device is converted from the 66 b code block stream that is output after FlexE completes shim processing, the transmit-end interface variable device may configure, based on an interface binding status of the FlexE, the physical interface of the transmit-end interface variable device as an OTUk interface, a FlexO interface, or a FlexE interface.

Figure 15A:
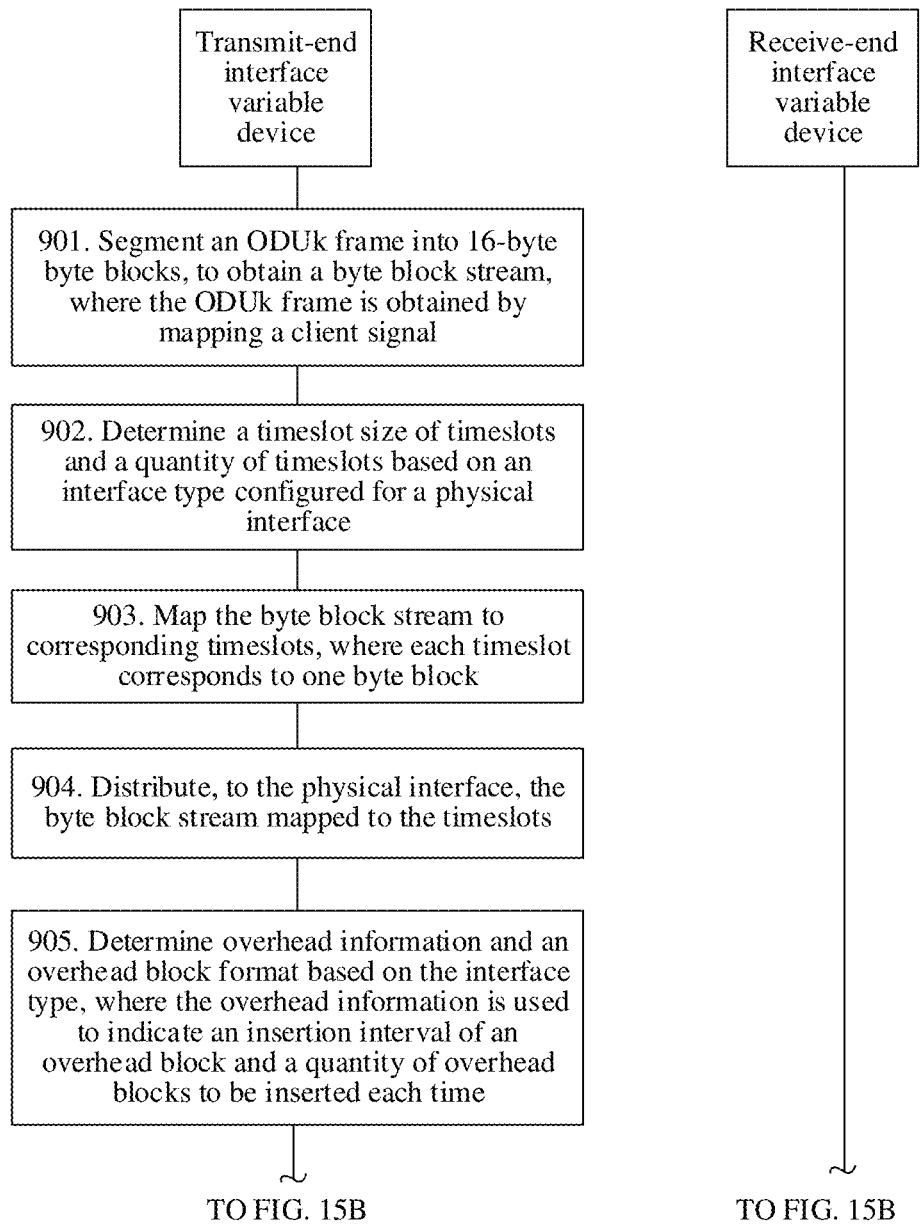
FIG. 15A is a flowchart of a method for transmission using an interface according to another example of an embodiment.
Figure 15B:
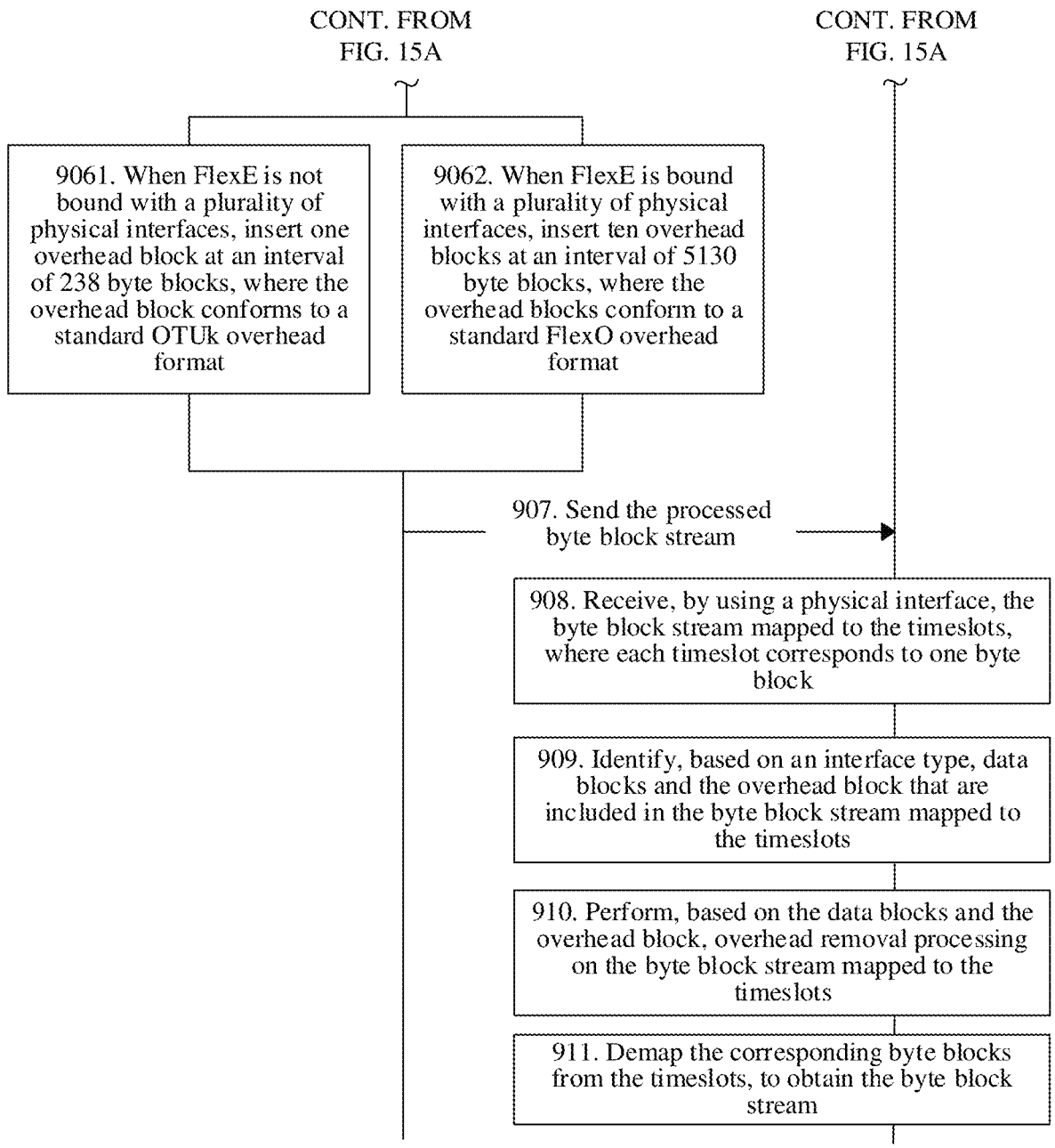
FIG. 15B is a flowchart of a method for transmission using an interface according to another example of an embodiment.

In a possible implementation, based on FIG. 9, as shown in FIG. 15A and FIG. 15B, step 906 may be replaced with the following steps.

Step 9061. When the FlexE is not bound with a plurality of physical interfaces, insert one overhead block at an interval of 238 byte blocks, where the overhead block conforms to a standard OTUk overhead format.

Figure 16:
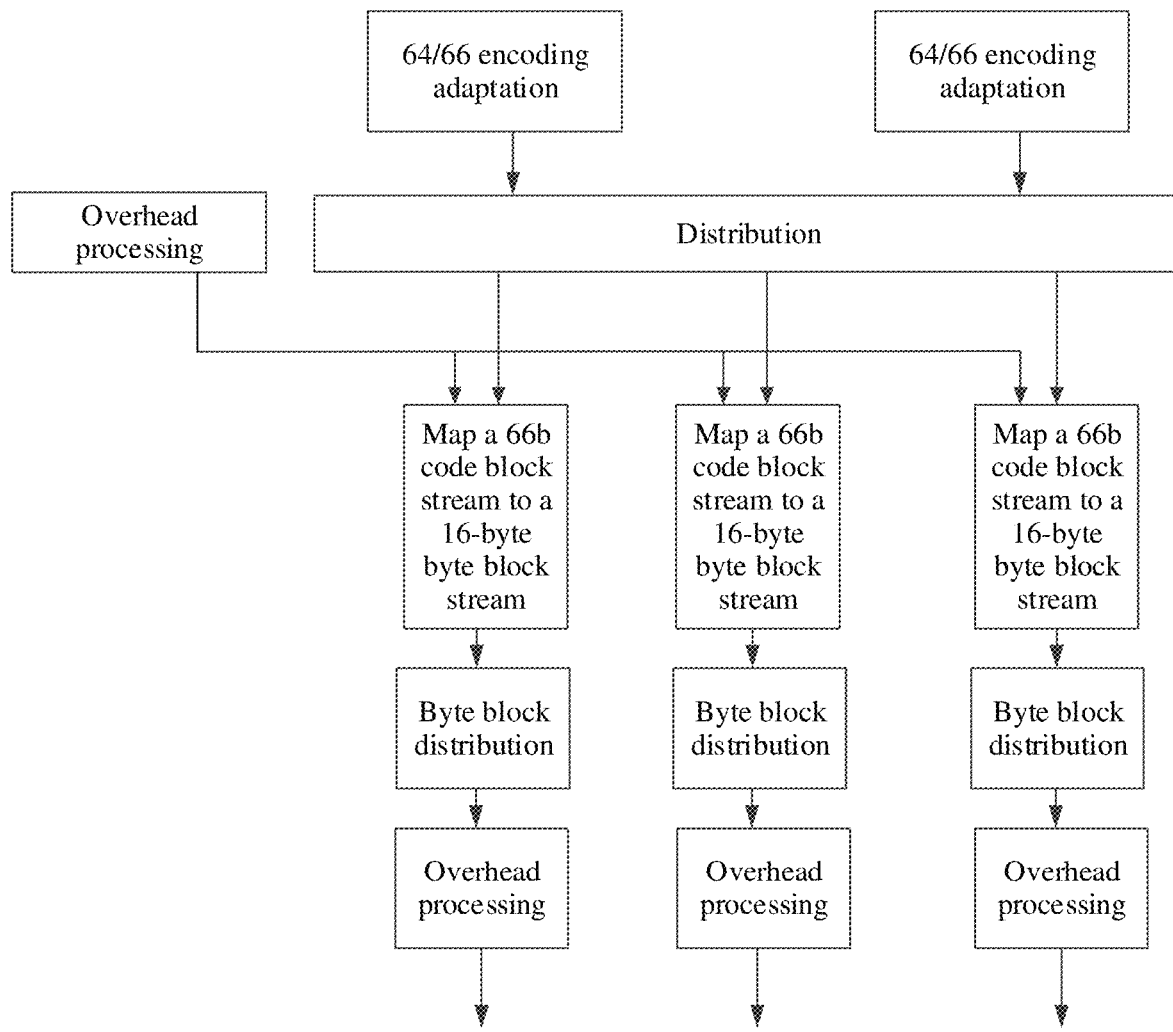
FIG. 16 is a schematic diagram of implementation of a presentation process of an OTUk interface, a FlexO interface, or a FlexE interface.

As shown in FIG. 16, after completing the shim layer processing, and distributing the 66 b code blocks (on which the 64/66 encoding adaptation is performed) to various paths (where overhead processing is performed in a distribution process), the FlexE does not directly send the 66 b code block stream, but maps the 66 b code block stream in the various paths into the 16-byte byte block stream. A mapping manner is described in step 1201.

Further, the transmit-end interface variable device maps the byte block stream to corresponding timeslot locations at the intermediate layer, and then distributes the byte block stream based on the byte blocks. Before transmitting the byte block stream by using the physical interface, the transmit-end interface variable device performs the overhead processing on the byte block stream in the various paths based on the interface binding status of the FlexE, and outputs the byte block stream on which the overhead processing has been performed.

For example, when the FlexE is not bound with the plurality of physical interfaces, only one path of distribution is included, the transmit-end interface variable device inserts one overhead block (conforming to the standard OTUk overhead format) at the interval of 238 byte blocks. In this case, the physical interface of the transmit-end interface variable device is presented as the OTUk interface.

Step 9062. When the FlexE is bound with a plurality of physical interfaces, insert ten overhead blocks at an interval of 5130 byte blocks, where the overhead blocks conform to a standard FlexO overhead format.

When the FlexE is bound with the plurality of physical interfaces, the transmit-end interface variable device inserts ten overhead blocks (conforming to the standard FlexO overhead format) at the interval of 5130 byte blocks. In this case, the physical interface of the transmit-end interface variable device is presented as the FlexO interface.

It can be noted that in this scenario, if the transmit-end interface variable device still inserts one overhead block at the interval of 238 bytes blocks, the transmit-end interface variable device presents a plurality of independent OTUk interfaces. Correspondingly, when restoring the service data, the receive-end interface variable device needs to restrict a plurality of independent OTUk transmission paths, to ensure alignment of the plurality of paths at a receive end.

Optionally, when the FlexE is bound with the plurality of physical interfaces, and no overhead block is inserted during the overhead processing, the physical interface of the transmit-end interface variable device is presented as a standard FlexE interface.

In the foregoing embodiments, steps performed by the transmit-end interface variable device serving as an execution body may be separately implemented as a method for transmission using an interface that is to be performed by the transmit-end interface variable device, and steps performed by the receive-end interface variable device serving as an execution body may be separately implemented as a method for transmission using an interface that is to be performed by the receive-end interface variable device. Details are not described in the embodiments.

Figure 17:
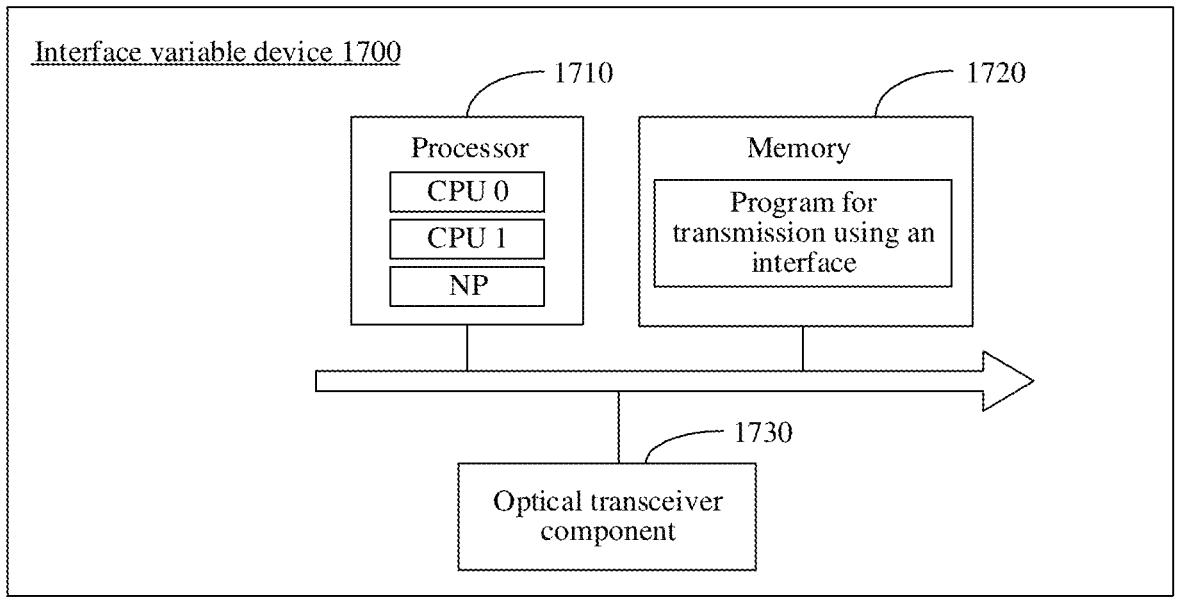
FIG. 17 is a schematic structural diagram of an interface variable device according to an example of an embodiment.

FIG. 17 is a schematic structural diagram of an interface variable device 1700 according to an example of an embodiment. As shown in FIG. 17, the interface variable device 1700 may include: a processor 1710, a memory 1720, and an optical transceiver component 1730.

The processor 1710 may include one or more processing units. The processing unit may be a central processing unit (CPU), a network processor (NP), or the like.

The memory 1720 may be configured to store a program for transmission using an interface, and the program may be executed by the processor 1710. In addition, the program may include an obtaining module, a mapping module, a distribution module, a processing module, and an output module.

The obtaining module is executed by the processor 1710, to implement a function related to the obtaining of the byte block stream in the foregoing embodiments.

The mapping module is executed by the processor 1710, to implement a function related to the timeslot mapping in the foregoing embodiments.

The distribution module is executed by the processor 1710, to implement a function related to the distribution of the byte blocks in the foregoing embodiments.

The processing module is executed by the processor 1710, to implement a function related to the overhead processing of the byte block stream in the foregoing embodiments.

The output module is executed by the processor 1710, to implement a function related to the outputting of the processed byte block stream in the foregoing embodiments.

The optical transceiver component 1730 may include an optical receiving component and an optical sending component (including a physical interface). In this embodiment, the optical transceiver component 1730 sends, to a receive end by using the optical sending component, the byte block stream processed by the processor.

Figure 18:
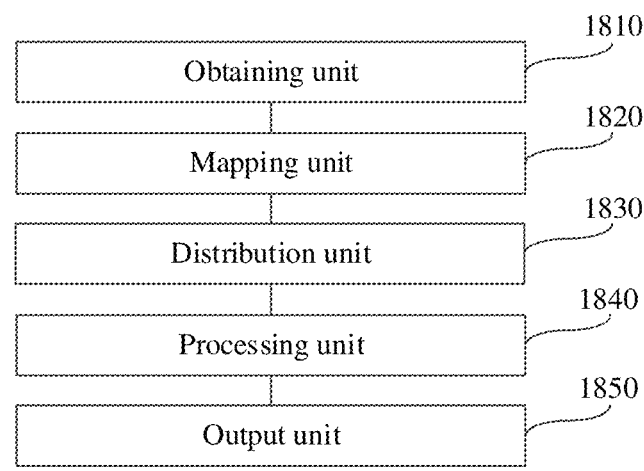
FIG. 18 is a structural block diagram of an apparatus for transmission using an interface according to an example of an embodiment.

FIG. 18 is a structural block diagram of an apparatus for transmission using an interface according to an example of an embodiment. The apparatus for transmission using an interface may be implemented as a part or all of an interface variable device by using a hardware circuit or a combination of hardware and software. The apparatus for transmission using an interface may include: an obtaining unit 1810, a mapping unit 1820, a distribution unit 1830, a processing unit 1840, and an output unit 1850.

The obtaining unit 1810 is executed by a processor, to implement a function related to the obtaining of the byte block stream in the foregoing embodiments.

The mapping unit 1820 is executed by the processor, to implement a function related to the timeslot mapping in the foregoing embodiments.

The distribution unit 1830 is executed by the processor, to implement a function related to the distribution of the byte blocks in the foregoing embodiments.

The processing unit 1840 is executed by the processor, to implement a function related to the overhead processing of the byte block stream in the foregoing embodiments.

The output unit 1850 is executed by the processor, to implement a function related to the outputting of the processed byte block stream in the foregoing embodiments.

It can be noted that when the apparatus provided in the foregoing embodiment performs transmission using an interface, division of the foregoing functional units is merely used as an example for description. In an application, the foregoing functions may be allocated, based on a requirement, to different functional units for implementation, that is, an inner structure of the device is divided into different functional units to implement all or some of the functions described above. In addition, the apparatus for transmission using an interface provided in the foregoing embodiment and the method embodiment of the method for transmission using an interface belong to a same conception. For an implementation process of the information transmission apparatus, refer to the method embodiment. Details are not described herein again.

When the interface variable device is an OTN device, the apparatus for transmission using an interface provided in the foregoing embodiment is located on a side of the line board 250 of the OTN device 200 shown in FIG. 2, and the system control and communications board 270 of the OTN device 200 dynamically changes an interface type of a physical interface based on a parameter such as a transmission rate of the physical interface presented by the OTN device.

Figure 19:
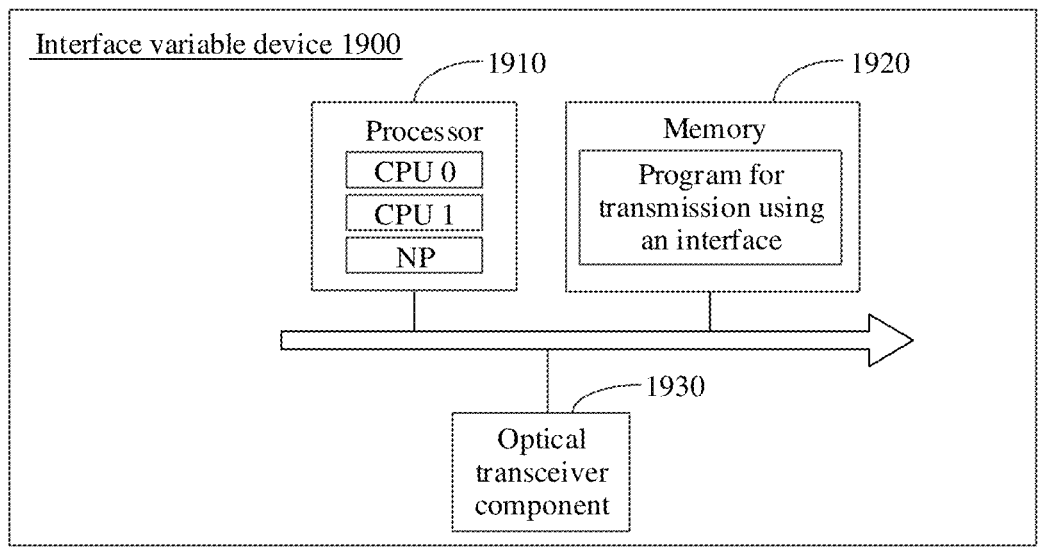
FIG. 19 is a schematic structural diagram of an interface variable device according to an example of an embodiment.

FIG. 19 is a schematic structural diagram of an interface variable device 1900 according to an example of an embodiment. As shown in FIG. 19, the interface variable device 1900 may include: a processor 1910, a memory 1920, and an optical transceiver component 1930.

The processor 1910 may include one or more processing units. The processing unit may be a CPU, a NP, or the like.

The memory 1920 may be configured to store a program for transmission using an interface, and the program may be executed by the processor 1910. In addition, the program may include a receiving module, a processing module, and a restoration module.

The receiving module is executed by the processor 1910, to implement a function related to the receiving of the byte block stream that is output by the transmit-end interface variable device in the foregoing embodiments.

The processing module is executed by the processor 1910, to implement a function related to the overhead removal processing in the foregoing embodiments.

The restoration module is executed by the processor 1910, to implement a function related to the extraction of a byte block from a timeslot in the foregoing embodiments.

The optical transceiver component 1930 may include an optical receiving component and an optical sending component (including a physical interface). In this embodiment, the optical transceiver component 1930 receives, by using the optical receiving component, the byte block stream mapped to timeslots that is transmitted from a transmit end.

Figure 20:
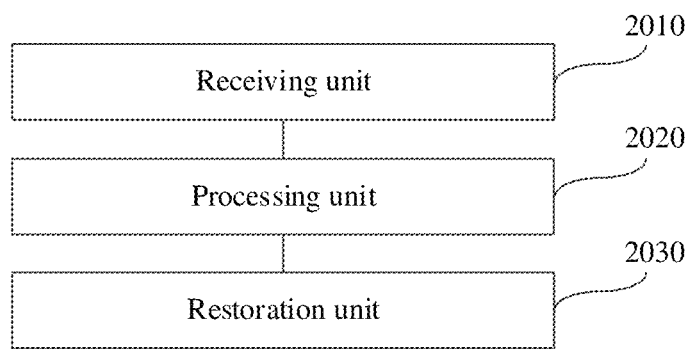
FIG. 20 is a structural block diagram of an apparatus for transmission using an interface according to an example of an embodiment.

FIG. 20 is a structural block diagram of an apparatus for transmission using an interface according to an example of an embodiment. The apparatus for transmission using an interface may be implemented as a part or all of an interface variable device by using a hardware circuit or a combination of software and hardware. The apparatus for transmission using an interface may include: a receiving unit 2010, a processing unit 2020, and a restoration unit 2030.

The receiving unit 2010 is executed by a processor, to implement a function related to the receiving of the byte block stream that is output by the transmit-end interface variable device in the foregoing embodiments.

The processing unit 2020 is executed by the processor, to implement a function related to the overhead removal processing in the foregoing embodiments.

The restoration unit 2030 is executed by the processor, to implement a function related to the extraction of a byte block from a timeslot in the foregoing embodiments.

It can be noted that when the apparatus provided in the foregoing embodiment performs transmission using an interface, division of the foregoing functional units is merely used as an example for description. In an application, the foregoing functions may be allocated, based on a requirement, to different functional units for implementation; that is, an inner structure of the device is divided into different functional units to implement all or some of the functions described above. In addition, the apparatus for transmission using an interface provided in the foregoing embodiment and the method embodiment of the method for transmission using an interface belong to a same conception. For an implementation process of the apparatus for transmission using an interface, refer to the method embodiment. Details are not described herein again. When the interface variable device is an OTN device, the apparatus for transmission using an interface provided in the foregoing embodiment is located on a side of the line board 250 of the OTN device 200 shown in FIG. 2, and the system control and communications board 270 of the OTN device 200 dynamically changes an interface type of a physical interface based on a parameter such as a transmission rate of the physical interface presented by the OTN device.

The sequence numbers of the foregoing embodiments are merely for description, and are not intended to indicate priorities of the embodiments.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, a compact disc, or the like.

The foregoing descriptions are merely optional embodiments, but are not intended as limiting. Any modification, equivalent replacement, or improvement made without departing from the spirit and principle of the embodiments fall within the protection scope.

What is claimed is:

1. A method for transmission using an interface, applied to an interface variable device, the method comprising:
   obtaining a byte block stream, wherein byte blocks in the byte block stream are of a predetermined byte length;
   mapping the byte block stream to corresponding timeslots, wherein each timeslot corresponds to one byte block;
   distributing the byte block stream mapped to the timeslots;
   performing overhead processing on the distributed byte block stream based on an interface type configured for the interface; and
   sending the processed byte block stream.

2. The method according to claim 1, wherein before the mapping the byte block stream to corresponding timeslots, the method further comprises: determining a timeslot size of the timeslots and a quantity of timeslots based on the interface type.

3. The method according to claim 1, wherein the overhead processing of the distributed byte block stream based on an interface type configured for the interface comprises: determining overhead information and an overhead block format based on the interface type, wherein the overhead information is used to indicate an insertion interval of an overhead block and a quantity of overhead blocks to be inserted each time; and
   performing overhead processing on the distributed byte block stream based on the overhead information and the overhead block format.

4. The method according to claim 3, wherein the predetermined byte length is 16 bytes.

5. The method according to claim 4, wherein the obtaining of the byte block stream comprises:
   segmenting an optical data unit-k (ODUk) frame into the 16-byte byte blocks, to obtain the byte block stream, wherein the ODUk frame is obtained by mapping a client signal.

6. The method according to claim 5, wherein the performing of overhead processing on the distributed byte block stream based on the overhead information and the overhead block format comprises:
   when the interface is an optical transport unit-k (OTUk) interface, inserting one overhead block into the distributed byte block stream at an interval of 238 byte blocks, wherein the overhead block conforms to a standard OTUk overhead format;
   when the interface is an n×100 G optical transport unit Cn (OTUCn) interface, inserting n overhead blocks into the distributed byte block stream at an interval of n*238 byte blocks; or
   when the interface is a flexible optical transport network (FlexO) interface, inserting ten overhead blocks into the distributed byte block stream at an interval of 5130 byte blocks, wherein the overhead blocks conform to a standard FlexO overhead format.

7. The method according to claim 4, wherein the obtaining of the byte block stream comprises: mapping 64 consecutive 66 b code blocks in a 66 b code block stream to 33 byte blocks, to obtain the byte block stream.

8. The method according to claim 7, wherein the performing of overhead processing on the distributed byte block stream based on the overhead information and the overhead block format comprises: when the interface type is a non-standard Ethernet interface, inserting one overhead block into the distributed byte block stream at a predetermined insertion interval.

9. The method according to claim 4, wherein the byte block stream is converted from a 66 b code block stream that is output after flexible Ethernet (FlexE) completes shim processing, and the performing of overhead processing on the distributed byte block stream based on the overhead information and the overhead block format comprises: when the FlexE is not bound with a plurality of physical interfaces, inserting one overhead block at an interval of 238 byte blocks, wherein the overhead block conforms to a standard optical transport unit-k (OTUk) overhead format;
   when the FlexE is bound with a plurality of physical interfaces, inserting ten overhead blocks at an interval of 5130 byte blocks, wherein the overhead blocks conform to a standard FlexO overhead format.

10. A method for transmission using an interface, applied to an interface variable device, the method comprising:
    receiving, by using a physical interface, a byte block stream mapped to timeslots, wherein each timeslot corresponds to one byte block, and the byte block is of a predetermined byte length;

performing overhead processing, based on an interface type of the physical interface, on the byte block stream mapped to the timeslots; and for the processed byte block stream mapped to the timeslots, demapping the corresponding byte blocks from the timeslots, to obtain the byte block stream.

11. The method according to claim 10, wherein the byte block stream mapped to the timeslots comprises an overhead block; and the overhead processing, based on an interface type of the physical interface, of the byte block stream mapped to the timeslots comprises:

identifying, based on the interface type, data blocks and the overhead block that are comprised in the byte block stream mapped to the timeslots; and performing, based on the data blocks and the overhead block, overhead removal processing on the byte block stream mapped to the timeslots.

12. The method according to claim 10, wherein the predetermined byte length is 16 bytes.

13. The method according to claim 11, wherein the identifying, based on the interface type, of the data blocks and the overhead block that are comprised in the byte block stream mapped to the timeslots comprises:

when the interface type is an optical transport unit-k (OTUk) interface, extracting one overhead block at an interval of 238 data blocks, wherein the overhead block conforms to a standard OTUk overhead format;

when the interface type is an n×100 G optical transport unit (OTUCn) interface, extracting n overhead blocks at an interval of n*238 data blocks; or when the interface type is a flexible optical transport network (FlexO) interface, extracting ten overhead blocks at an interval of 5130 data blocks, wherein the overhead blocks conform to a standard FlexO overhead format.

14. The method according to claim 11, wherein the identifying, based on the interface type, of the data blocks and the overhead block that are comprised in the byte block stream mapped to the timeslots comprises: when the interface type is a non-standard Ethernet interface, extracting one overhead block at an interval of a predetermined quantity of data blocks.

15. The method according to claim 14, wherein the method further comprises: demapping 64 66 b code blocks from 33 consecutive data blocks, to obtain a 66 b code block stream.

16. An apparatus for transmission using an interface, applied to an interface variable device, wherein the apparatus comprises a processor and an optical transceiver, and the processor is configured to:

obtain a byte block stream, wherein byte blocks in the byte block stream are of a predetermined byte length;

map the byte block stream to corresponding timeslots, wherein each timeslot corresponds to one byte block;

distribute the byte block stream mapped to the timeslots;

perform overhead processing on the distributed byte block stream based on an interface type configured for the interface; and the optical transceiver is configured to send the processed byte block stream.

17. The apparatus according to claim 16, wherein the processor is further configured to determine a timeslot size of the timeslots and a quantity of timeslots based on the interface type.

18. The apparatus according to claim 16, wherein the overhead processing of the distributed byte block stream based on an interface type configured for the interface comprises:

determination of overhead information and an overhead block format based on the interface type, wherein the overhead information is used to indicate an insertion interval of an overhead block and a quantity of overhead blocks to be inserted each time; and performing overhead processing on the distributed byte block stream based on the overhead information and the overhead block format.

19. The apparatus according to claim 18, wherein the predetermined byte length is 16 bytes.

20. The apparatus according to claim 19, wherein the obtaining a byte block stream, wherein byte blocks in the byte block stream are of a predetermined byte length comprises: segmentation of an optical data unit-k (ODUk) frame into the 16-byte byte blocks, to obtain the byte block stream, wherein the ODUk (ODUk) frame is obtained by mapping a client signal.

* * * * *